US010809061B2

(12) United States Patent
Zhang et al.

(10) Patent No.: US 10,809,061 B2
(45) Date of Patent: Oct. 20, 2020

(54) VIBRATORY GYROSCOPE INCLUDING A PLURALITY OF INERTIAL BODIES

(71) Applicant: Hitachi, Ltd., Chiyoda-ku, Tokyo (JP)

(72) Inventors: Yuhua Zhang, Tokyo (JP); Joan Giner, Tokyo (JP); Shinya Kajiyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 187 days.

(21) Appl. No.: 15/756,826

(22) PCT Filed: Jan. 27, 2016

(86) PCT No.: PCT/JP2016/052277
§ 371 (c)(1),
(2) Date: Mar. 1, 2018

(87) PCT Pub. No.: WO2017/130312
PCT Pub. Date: Aug. 3, 2017

(65) Prior Publication Data
US 2018/0266821 A1  Sep. 20, 2018

(51) Int. Cl.
*G01C 19/5684* (2012.01)
*G01C 19/574* (2012.01)
*G01C 19/5677* (2012.01)

(52) U.S. Cl.
CPC ....... *G01C 19/5684* (2013.01); *G01C 19/574* (2013.01); *G01C 19/5677* (2013.01)

(58) Field of Classification Search
CPC .............. G01C 19/5684; G01C 19/574; G01C 19/5677; G01C 19/5712; G01C 19/5747
See application file for complete search history.

(56) References Cited

U.S. PATENT DOCUMENTS 6,192,756 B1 * 2/2001 Kikuchi ............. G01C 19/5677
73/504.04
6,282,958 B1 9/2001 Fell et al.
(Continued)

FOREIGN PATENT DOCUMENTS

JP  9-42973 A  2/1997
JP  10-132571 A  5/1998
(Continued)

OTHER PUBLICATIONS

International Search Report (PCT/ISA/210) issued in PCT Application No. PCT/JP2016/052277 dated Apr. 12, 2016 with English translation (Eight (8) pages).
(Continued)

*Primary Examiner* — Helen C Kwok
(74) *Attorney, Agent, or Firm* — Crowell & Moring LLP

(57) ABSTRACT

Provided is a gyroscope including: a first inertial body that is displaceable in a first direction and a second direction perpendicular to the first direction; a second inertial body that is displaceable in the first direction and the second direction; a third inertial body that is displaceable in the first direction and the second direction; a fourth inertial body that is displaceable in the first direction and the second direction; a first connection unit that supports the first inertial body; a second connection unit that supports the second inertial body; a third connection unit that supports the third inertial body; a fourth connection unit that supports the fourth inertial body; and a connection body that is provided among the first inertial body, the second inertial body, the third inertial body, and the fourth inertial body and connects the first inertial body, the second inertial body, the third inertial body, and the fourth inertial body.

13 Claims, 24 Drawing Sheets

(56) References Cited

U.S. PATENT DOCUMENTS

| | | | | |
|---|---|---|---|---|
| 7,513,155 B2* | 4/2009 | Jeong | ................ | G01C 19/5747 |
| | | | | 73/504.02 |
| 8,544,594 B2* | 10/2013 | Yacine | ............... | G01C 19/5747 |
| | | | | 181/113 |
| 2007/0062282 A1* | 3/2007 | Akashi | ................. | G01P 15/097 |
| | | | | 73/504.12 |
| 2009/0173157 A1 | 7/2009 | Stewart | | |
| 2010/0199762 A1* | 8/2010 | Meisel | ............... | G01C 19/5684 |
| | | | | 73/504.12 |
| 2010/0223996 A1* | 9/2010 | Fukumoto | ............... | G01C 19/56 |
| | | | | 73/504.12 |
| 2010/0263446 A1* | 10/2010 | Tamura | ............... | G01C 19/5712 |
| | | | | 73/504.12 |
| 2012/0024056 A1* | 2/2012 | Hammer | ............ | G01C 19/5712 |
| | | | | 73/504.02 |
| 2012/0048017 A1* | 3/2012 | Kempe | ............... | G01C 19/5747 |
| | | | | 73/504.12 |
| 2012/0216613 A1* | 8/2012 | Honda | ............... | G01C 19/5747 |
| | | | | 73/504.15 |
| 2014/0090470 A1 | 4/2014 | Fujimoto et al. | | |
| 2014/0260610 A1* | 9/2014 | McNeil | ............... | G01C 19/5712 |
| | | | | 73/504.12 |
| 2014/0352431 A1* | 12/2014 | Leclerc | ............... | G01C 19/5712 |
| | | | | 73/504.04 |
| 2015/0330783 A1* | 11/2015 | Rocchi | ............... | G01C 19/5747 |
| | | | | 73/504.12 |
| 2016/0084654 A1* | 3/2016 | Senkal | ............... | G01C 19/5726 |

FOREIGN PATENT DOCUMENTS

| | | |
|---|---|---|
| JP | 11-83498 A | 3/1999 |
| JP | 2001-526790 A | 12/2001 |
| JP | 2009-162760 A | 7/2009 |
| JP | 2010-8300 A | 1/2010 |
| JP | 2012-145493 A | 8/2012 |
| JP | 2014-194423 A | 10/2014 |
| JP | 2015-203604 A | 11/2015 |
| WO | WO 2013/005625 A1 | 1/2013 |

OTHER PUBLICATIONS

Japanese-language Written Opinion (PCT/ISA/237) issued in PCT Application No. PCT/JP2016/052277 dated Apr. 12, 2016 (Five (5) pages).

\* cited by examiner

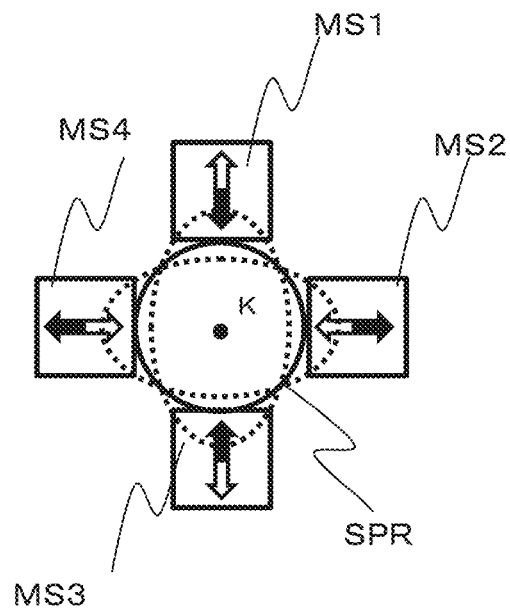
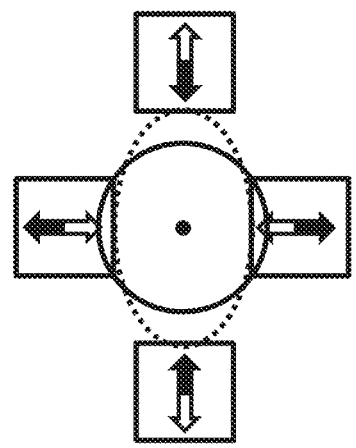
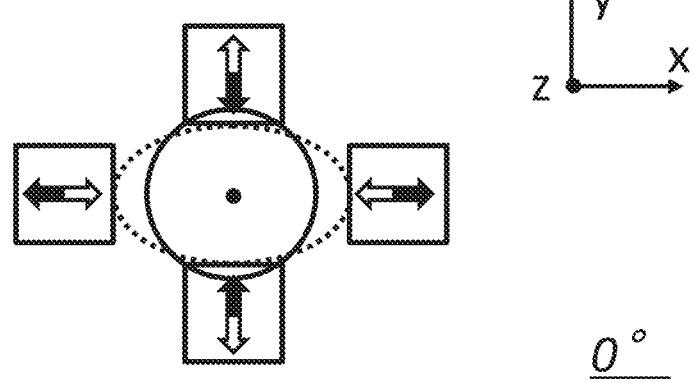

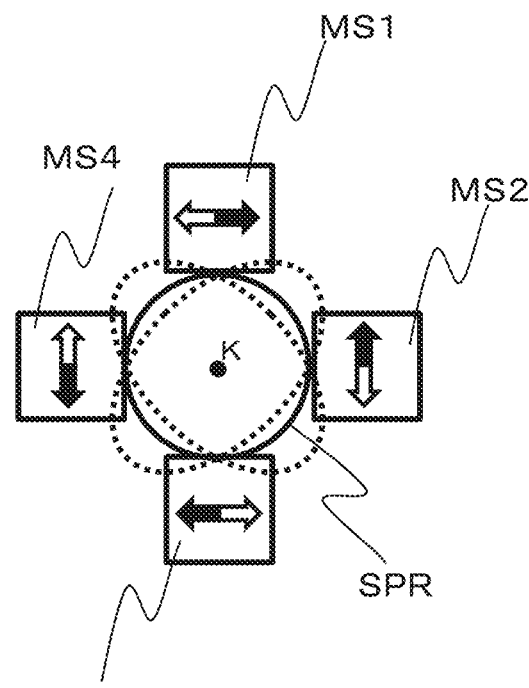
Fig. 4D
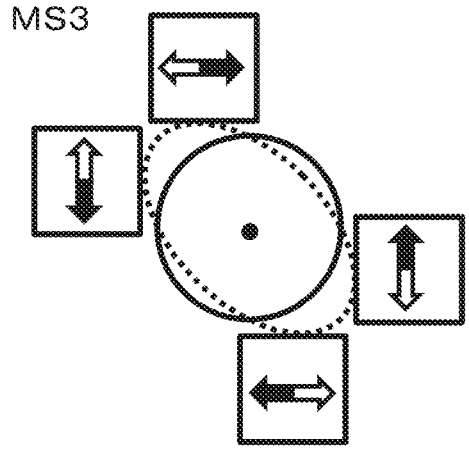
Fig. 4E
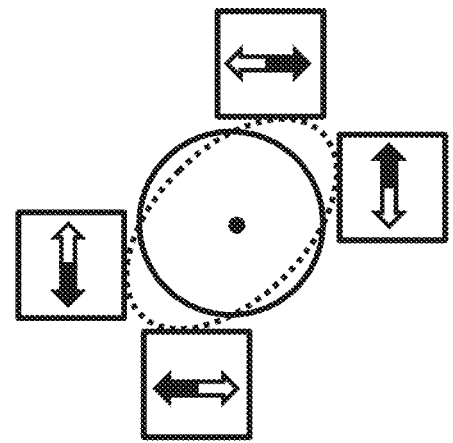
Fig. 4F
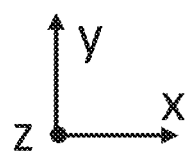
45°

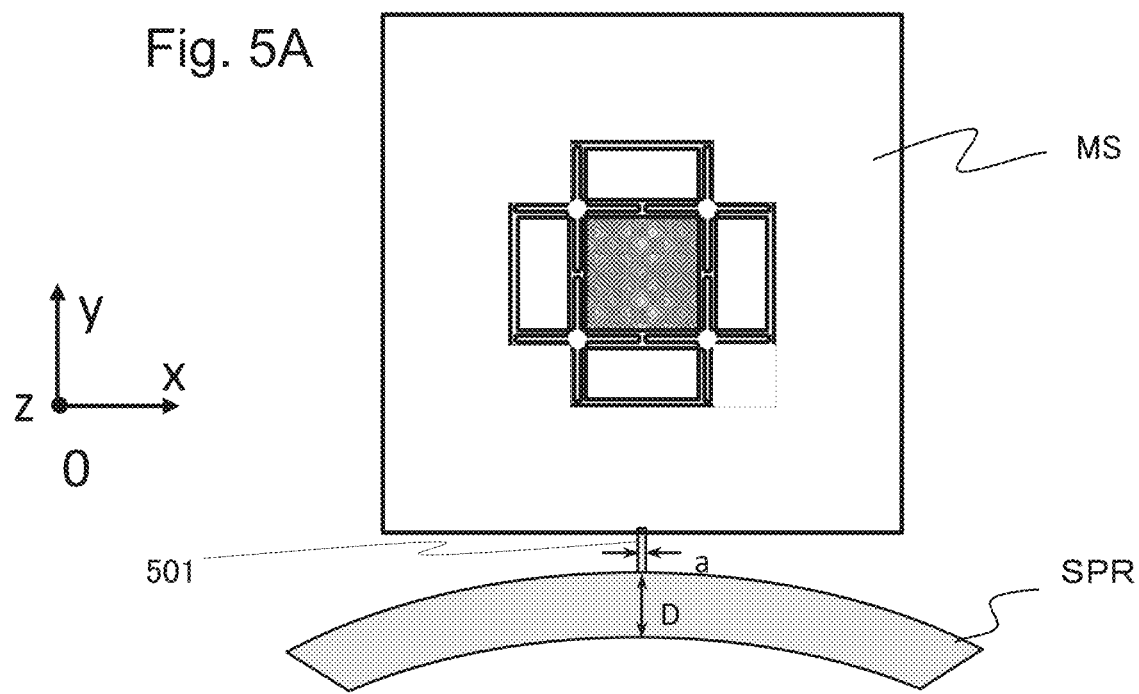
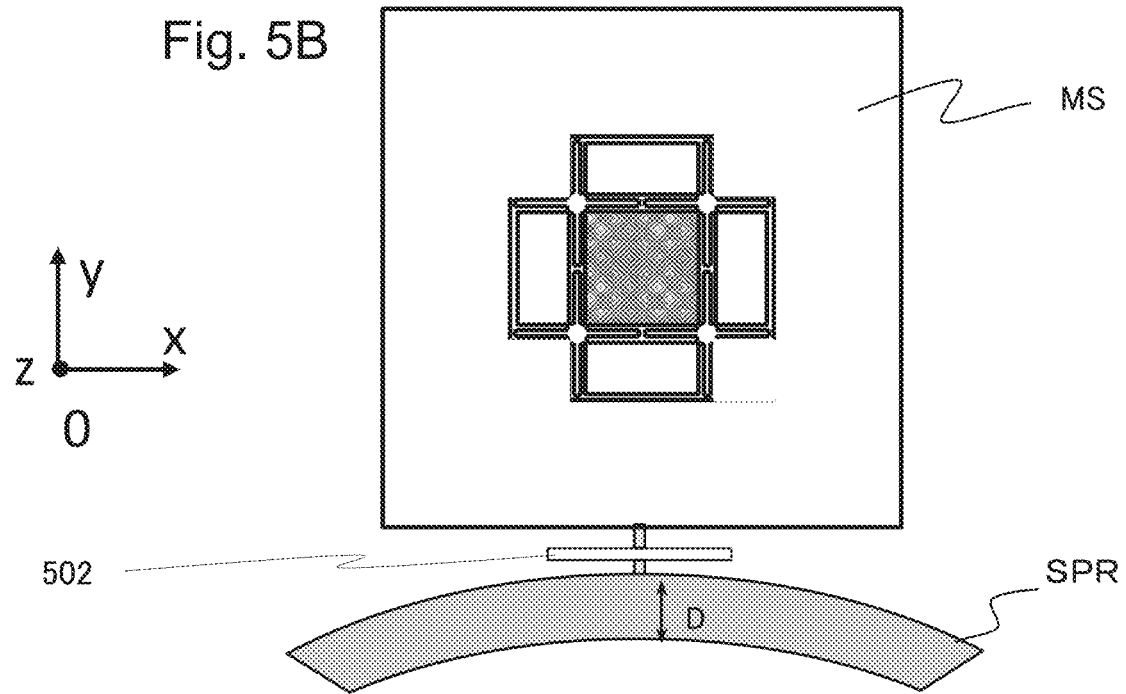

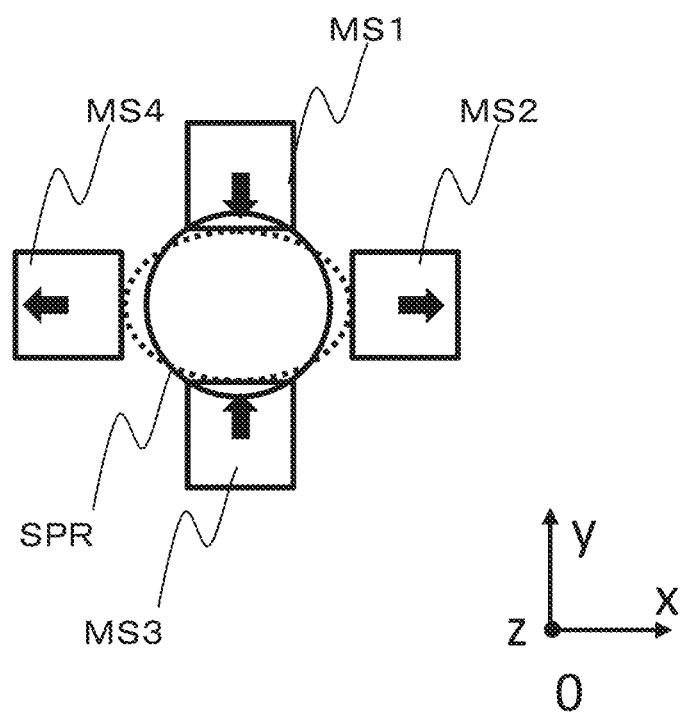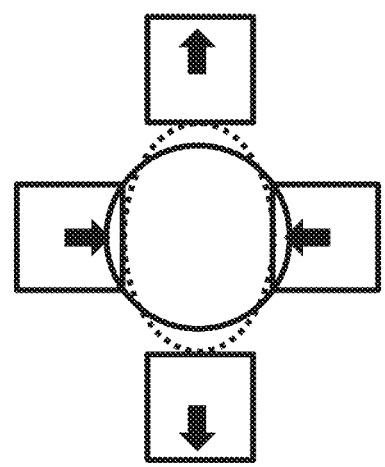
Fig. 10C
Fig. 10D

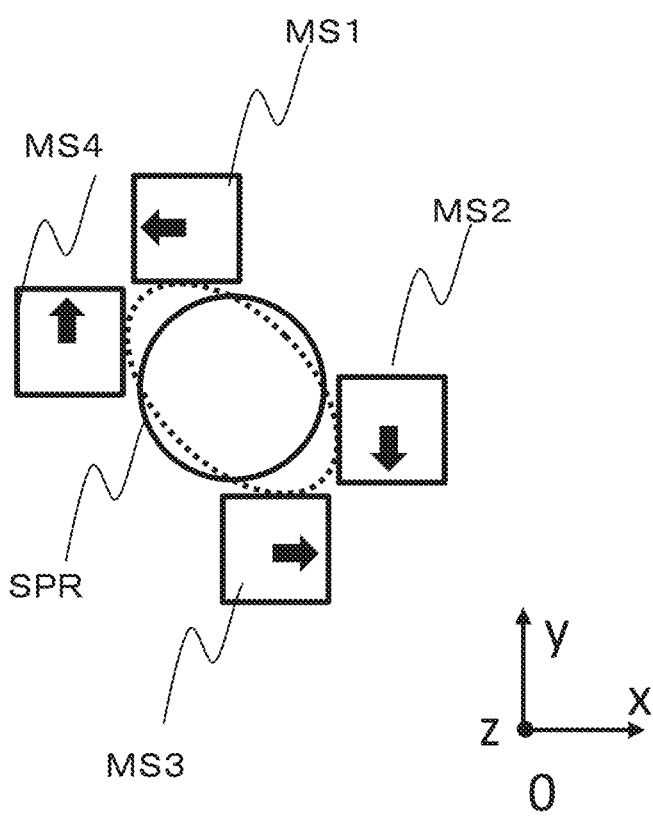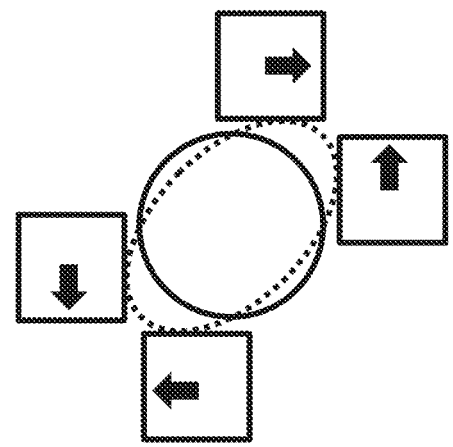
Fig. 10E
Fig. 10F

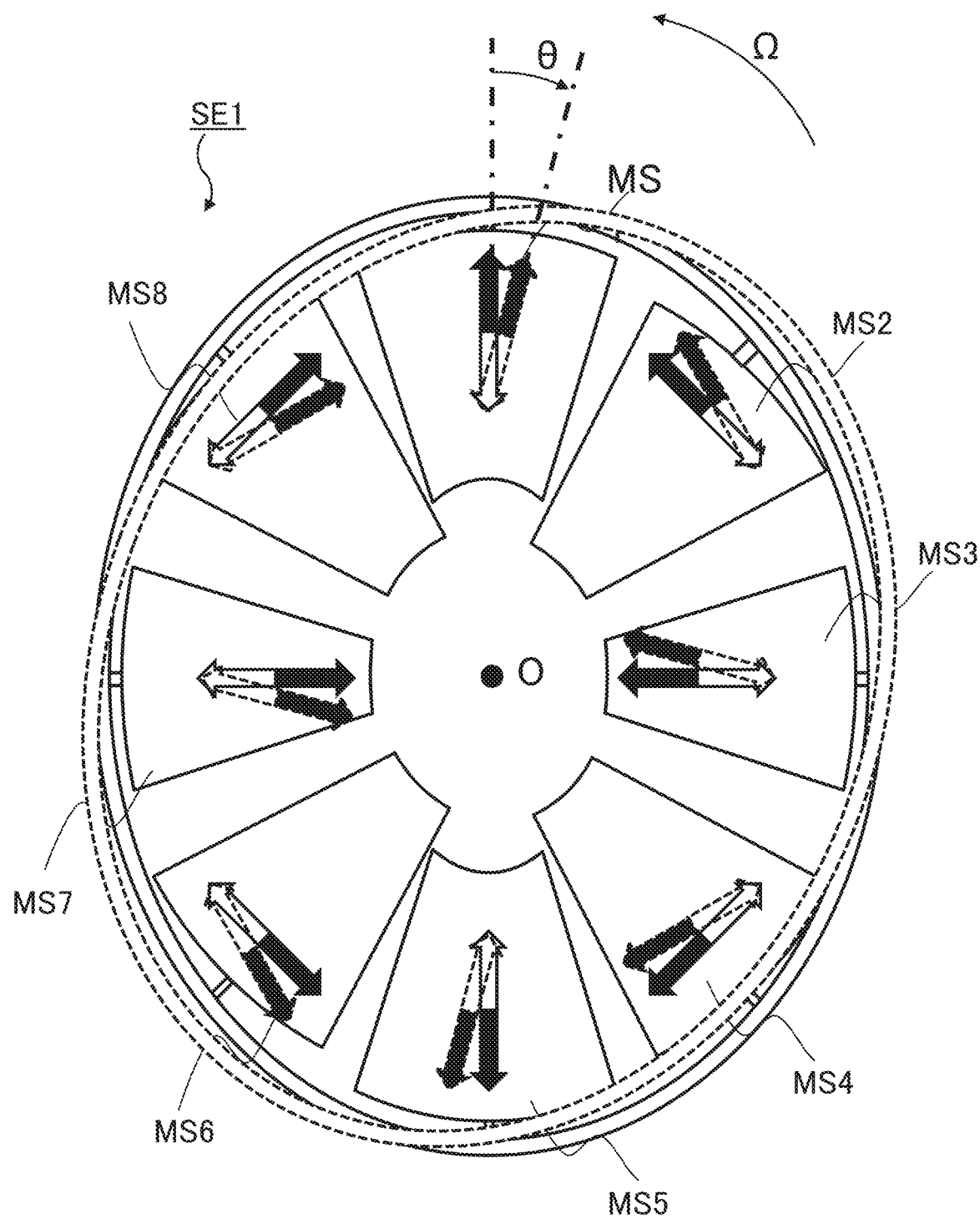

VIBRATORY GYROSCOPE INCLUDING A PLURALITY OF INERTIAL BODIES

TECHNICAL FIELD

The present invention relates to a gyroscope, for example, an effective technique applied to a gyroscope formed by using micro electro mechanical systems (MEMS) technology.

BACKGROUND ART

Patent Document 1 discloses a technique relating to an inertial sensor for detecting an angular velocity (yaw rate) applied around an axis in a thickness direction of a substrate and an acceleration of two axes applied in an in-plane direction of the substrate by using a vibrator formed on the substrate.

Patent Document 2 discloses a technique relating to an angular velocity sensor or a gyroscope including a ring-shaped resonator mounted by a support beam extending from an inner peripheral portion of a ring to a protrusion on a base.

Patent Document 3 relates to a capacitive bulk acoustic wave disk gyroscope and discloses a technique relating to a self-calibrating capacitive bulk acoustic wave disk gyroscope.

CITATION LIST

Patent Document

Patent Document 1: JP 2010-008300 A
Patent Document 2: JP 2001-526790 A
Patent Document 3: JP 2009-162760 A

SUMMARY OF THE INVENTION

Problems to be Solved by the Invention

For example, navigation systems are expected to be used in a wide variety of fields such as personal navigation, military navigation, vehicle sideslip prevention systems, virtual reality systems, and unmanned airplanes. A basic constituent element of this navigation system is a gyroscope. The gyroscope is a sensor capable of detecting an angular velocity, and the navigation system determines a rotation angle from the angular velocity.

As traditional gyroscopes, there are an optical gyroscope, a gyroscope using a rotating inertial body, and the like. However, these gyroscopes are large in size and heavy in weight. In addition, such gyroscopes are expensive and have high power consumption. Regarding this point, in the trend of the current industry, miniaturization and high performance of the gyroscope are desired, but the above-mentioned gyroscope does not comply with the trend.

Herein, in recent years, a gyroscope using MEMS technology has appeared. The gyroscope using this MEMS technology has a potential to realize miniaturization and high performance complying with the above-mentioned trend. In addition, the gyroscope using the MEMS technology is excellent in mass productivity and has an advantage of realizing low cost.

An object of the present invention is to provide a technique capable of further improving performance of a gyroscope using MEMS technology.

Solutions to Problems

The vibratory gyroscope using the MEMS technology is a gyroscope that detects an angular velocity by detecting energy coupling between vibrations perpendicular to each other according to the Coriolis force principle. In principle, in a vibratory gyroscope, when an angular velocity around the z direction is applied in a state where the driving vibrator which can vibrate only in the x direction vibrates in the x direction, the Coriolis force causes the vibration in the y direction to occur in the sensing vibrator which can vibrate only in the y direction. In addition, in the vibratory gyroscope, the angular velocity around the z direction can be detected by measuring the magnitude of the vibration in the y direction.

As disclosed in Patent Document 1, such a difference is acquired by using a plurality of vibrators having a tuning fork structure, it is possible to construct a gyroscope that is strong against an external impact force. The gyroscope in which the driving vibrators and the sensing vibrator are separated is referred to as a Class-1 gyroscope.

In addition, there is a gyroscope in which the driving vibrator and the sensing vibrator are integrated, and the driving axis and the sensing axis are exchanged with each other. A gyroscope having such a configuration is referred to as a Class-2 vibratory gyroscope. Class-2 vibratory gyroscopes are described, for example, in Patent Document 2 and Patent Document 3, but the gyroscopes are characterized in that resonance carrier mode vibration is remained. A Class-2 vibratory gyroscope is characterized in that self calibration becomes possible as described in, for example, Patent Document 3.

However, the vibratory gyroscope for calculating the rotational angular velocity is not suitable for use in a navigation system. This is because, in the navigation system, it is necessary to obtain the rotation angle, but in the current vibratory gyroscope, the rotation angle is calculated by integrating the detected angular velocity with time.

In other words, this is because, for example, when the angular velocity is to be detected, a bias error and a drift error exist, however when the angular velocity is to be integrated in order to calculate the rotation angle, at the same time, the bias error and the drift error accompanying the angular velocity are also integrated, so that these errors are amplified. That is, in the navigation system, in some cases, it is necessary to integrate the angular velocity over a long period of time. In these cases, particularly, the bias error and the drift error are also integrated, and thus, the magnitude of the error increases. Therefore, particularly in the vibration type gyro sensor used to obtain the rotation angle like the navigation system, it is desired to contrive a technique capable of suppressing the amplification of the error and a function of directly detecting the angle.

According to an aspect of the present invention, there is provided a gyroscope including a ring-shaped elastic body, a plurality of inertial bodies that are mechanically connected to the ring-shaped elastic body and capable of vibrating in an arbitrary direction in a plane, a driving vibration unit that allows the inertial bodies to vibrate, and a sensor unit that detects displacement of the inertial bodies.

According to another aspect of the present invention, there is provided a gyroscope including a first inertial body that is displaceable in a first direction and a second direction perpendicular to the first direction, a second inertial body that is displaceable in the first direction and the second direction, a third inertial body that is displaceable in the first direction and in the second direction, a fourth inertial body that is displaceable in the first direction and the second direction, a first connection unit that supports the first inertial body, a second connection unit that supports the second inertial body, a third connection unit that supports the third inertial body, a fourth connection unit that supports the fourth inertial body, and a connection body that is provided among the first inertial body, the second inertial body, the third inertial body, and the fourth inertial body and connects the first inertial body, the second inertial body, the third inertial body, and the fourth inertial body.

According to another aspect of the present invention, there is provided a gyroscope including four or more inertial bodies. For example, a gyroscope includes a first inertial body that is displaceable in a first direction and a second direction perpendicular to the first direction, a second inertial body that is displaceable in the first direction and the second direction, a third inertial body that is displaceable in the first direction and the second direction, a fourth inertial body that is displaceable in the first direction and the second direction, a fifth inertial body that is displaceable in a third direction and a fourth direction perpendicular to the third direction, a sixth inertial body that is displaceable in the third direction and the fourth direction, a seventh inertial body that is displaceable in the third direction and the fourth direction, an eighth inertial body that is displaceable in the third direction and the fourth direction, a first connection unit that supports the first inertial body, a second connection unit that supports the second inertial body, a third connection unit that supports the third inertial body, a fourth connection unit that supports the fourth inertial body, a fifth connection unit that supports the fifth inertial body, a sixth connection unit that supports the sixth inertial body, a seventh connection unit that supports the seventh inertial body, an eighth connection unit that supports the eighth inertial body, and a connection body that is provided among the first to eighth inertial bodies, and connects the first to eighth inertial bodies.

According to still another aspect of the present invention, there is provided a gyroscope including a plurality of inertial bodies that are displaceable in a first direction and a second direction perpendicular to the first direction, connection units that support the plurality of respective inertial bodies, and a coupling spring that is provided among the plurality of inertial bodies and connects the plurality of inertial bodies.

EFFECTS OF THE INVENTION

It is possible to improve performance of a gyroscope using MEMS technology.

BRIEF DESCRIPTION OF THE DRAWINGS

FIGS. 4A to 4C are schematic diagrams of an example of an inflection pattern of a ring-shaped coupling spring.

FIGS. 4D to 4F are schematic diagrams (degenerate mode) of an example of an inflection pattern of a ring-shaped coupling spring.

FIGS. 5A and 5B are plan diagrams illustrating an example of a structure of a ring-shaped coupling spring and a connection unit of an inertial body.

FIGS. 10C and 10D are schematic diagrams illustrating a state where an inertial body connected to a ring-shaped coupling spring by a connection unit is driven to vibrate in a radial direction.

FIGS. 10E and 10F are schematic diagrams illustrating a state where an inertial body connected to a ring-shaped coupling spring by a connection unit is driven to vibrate in a circumferential direction.

FIG. 14C is a schematic diagram illustrating a principle of exchanging energy in a case where an angular velocity is applied.

MODE FOR CARRYING OUT THE INVENTION

Figure 1A:
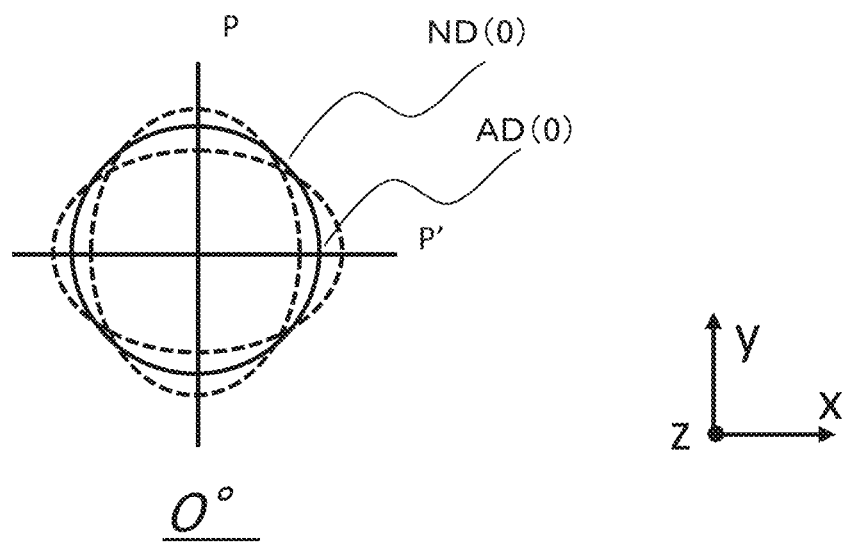
FIGS. 1A and 1B are schematic diagrams of vibration of a ring vibration structure.

In the following embodiments, if necessary for the convenience, the embodiments will be divided into a plurality of sections or embodiments, and description thereof will be made. However, unless otherwise stated, these embodiments and the like are not unrelated to each other, but one embodiment is in a relationship such as modifications, details, supplementary explanation of a portion or the whole of the other embodiments.

In addition, in the following embodiments, when the number of elements and the like (including the number, numerical value, amount, range, and the like) are referred to, unless otherwise stated or unless otherwise obviously limited to a specific number in principle, the number is not limited to the specific number and may be a specific number or more or less.

In addition, in the following embodiments, unless otherwise stated or unless otherwise considered to be obviously indispensable in principle, it goes without saying that the constituent elements (including the element steps and the like) are not necessarily indispensable.

Similarly, in the following embodiments, when shapes, positional relationships, and the like of constituent elements, and the like are referred to, unless otherwise stated or unless otherwise considered to be obviously indispensable in principle, shapes and the like substantially approximate or similar to the shapes and the like are included. This is also applied to the above-mentioned numerical values and ranges.

In addition, in all the drawings illustrating the embodiments, the same components are denoted by the same reference symbols in principle, and the redundant description thereof will be omitted. In addition, for the better understanding of the drawings, in some times, hatching and patterns may be added even in a plan diagram.

In the configuration of the invention described below, the same components or components having the same functions in different figures are denoted by the same reference numeral, and redundant description thereof may be omitted.

In this specification and the like, notations such as "first", "second", and "third" are attached to identify constituent elements, and the notations do not necessarily limit numbers or orders. In addition, a number for identifying the constituent element is used for each context, and thus, the number used in one context does not necessarily indicate the same constituent element in other contexts. In addition, it does not preclude the possibility that a constituent element identified by a certain number has a function of another constituent element identified by another number.

For the better understanding of the invention, the positions, sizes, shapes, ranges, and the like of the respective components illustrated in the drawings and the like may not represent actual positions, sizes, shapes, ranges and the like. Therefore, the present invention is not necessarily limited to the positions, sizes, shapes, ranges and the like disclosed in drawings and the like.

First Embodiment

In the following embodiments, a configuration capable of directly measuring a rotation angle in a Class-2 vibratory gyroscope suitable for applying the MEMS microfabrication technology will be described. In a Class-2 Coriolis vibratory gyroscope, a linear momentum is generated, and due to the linear momentum, a Coriolis force is generated when the gyroscope is rotated around an appropriate axis. The Coriolis force generates a vibrating motion with vibration in a resonant carrier mode along an axis perpendicular to an axis of applied angular and linear momentum. The amplitude of the vibrating motion is directly proportional to the speed of rotation applied, and the rotation angle of the vibration axis is directly proportional to the angle of rotation applied.

Since an angle measurement sensitivity (Angular Gain) of the gyroscope having the vibration structure described above is determined by a shape feature of a structure irrespective of a processing error, the sensitivity is stable. For example, the ring vibration structure is an example of a resonator suitable for a manufacturing method using MEMS microfabrication technology.

Figure 1B:
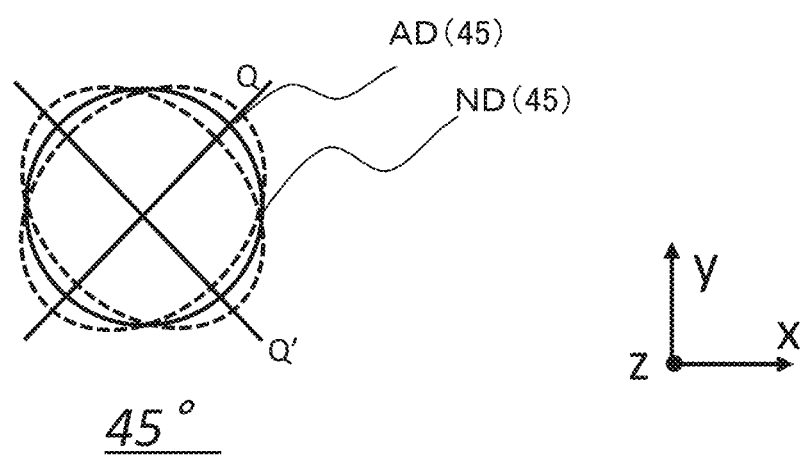

FIGS. 1A and 1B illustrate schematic diagrams of vibration of the ring vibration structure. The ring vibration structure is indicated by a solid circle in FIGS. 1A and 1B. A state of vibration of the ring vibration structure is indicated by a dotted circle. The ring vibration structure is typically excited to the cos 2θ resonance mode. In the case of a completely symmetrical resonator, in this mode, a degenerate vibration mode exists at a mutual angle of θ=45°. In such a vibration mode, the vibration of the ring vibration structure is illustrated around the primary axes P and P' of FIG. 1A and the secondary axes Q and Q' of FIG. 1B.

In FIG. 1A and FIG. 1B, points having the minimum vibration amplitude are referred to as "nodes". In FIGS. 1A and 1B, for example, ND(0) and ND(45) are nodes. In addition, points having the maximum vibration amplitude are referred to as "antinodes". For example, AD(0) and AD(45) are antinodes. In addition, the node ND(0) in the mode of FIG. 1A is the antinode AD(45) in the mode of FIG. 1B, and the antinode AD(0) in the mode of FIG. 1A is the node ND(45) in the mode of FIG. 1B.

For example, when the ring vibration structure is excited with the axes P and P' as the drive axes and rotated about the axis (z axis) perpendicular to the ring plane, vibration is allowed to occur by the Coriolis force with the axes Q and Q' of the degenerate vibration mode as sensing axes. In addition, when the structure is excited with the axes Q and Q' as the drive axes and rotated around the axis (z axis) perpendicular to the ring plane, vibration is allowed to occur by the Coriolis force with the axes P and P' of the degenerate vibration mode as the sensing axes.

The Class-2 Coriolis vibration gyroscope has an orthogonal degenerate vibration mode in which the driving vibration axis and the sensing vibration axis are mutually exchanged, essentially in equilibrium, and symmetrical and perpendicular with respect to the input axis. In the following description, the radial direction of the ring vibration structure is referred to as a radial direction, and the circumferential direction of the ring vibration structure is referred to as a circumferential direction.

<Rate Integrating Gyroscope>

Before describing a specific configuration of the first embodiment, a related rate integrating gyroscope will be described.

A vibratory gyroscope using MEMS technology is a gyroscope that detects an angular velocity by detecting energy coupling between vibrations perpendicular to each other according to the Coriolis principle. An example of this vibratory gyroscope is a rate gyroscope.

In the rate gyroscope, for example, when an angular velocity around the z direction is applied in a state where the inertial body is driven to vibrate in the x direction, vibration in the y direction occurs in the inertial body due to the Coriolis force. Since the angular velocity is proportional to the magnitude (amplitude) of the vibration of the inertial body in the y direction, in the rate gyroscope, it is possible to detect the angular velocity around the z direction by measuring the amplitude of the vibration in the y direction. Then, the rate gyroscope is configured so that the rotation angle is calculated based on the detected angular velocity. For example, in the rate gyroscope, the rotation angle can be calculated by integrating the detected angular velocity with time.

Herein, for example, when the angular velocity is to be detected, the bias error and the drift error inevitably exist. However, when the angular velocity is to be integrated in order to calculate the rotation angle, at the same time, the bias error and the drift error accompanying the angular velocity are also integrated, so that these errors are amplified. That is, the rate gyroscope is configured so that the angular velocity is detected and the angular velocity is integrated with time to calculate the rotation angle. As a result, the bias error and the drift error accompanying the angular velocity are also integrated, so that these errors increase.

Particularly, from this, it is difficult to apply the rate gyroscope to a navigation in which the integration time becomes longer. That is, for a gyroscope used for applications such as a navigation in which the integration time becomes longer, it is preferable that the gyroscope has less error than the rate gyroscope.

Regarding this point, as a vibratory gyroscope, there is a gyroscope referred to as a rate integrating gyroscope. The principle of the rate integrating gyroscope is the same as that of a Foucault pendulum. In the rate integrating gyroscope, the inertial body vibrating in proportion to the applied angular velocity precesses. Therefore, if the speed and position in the two axes of the inertial body are known, it is possible to know the rotation angle.

As a result, in the rate integrating gyroscope, even if there is a measurement error of the rotation angle, this measurement error is not integrated and amplified. Therefore, the rate integrating gyroscope can improve the detection accuracy of the rotation angle as compared with the rate gyroscope.

Therefore, in the first embodiment, contrivance has been made from the viewpoint of further improving the performance of the rate integrating gyroscope on the premise of a rate integrating gyroscope capable of improving the detection accuracy of the rotation angle by directly measuring the rotation angle. In the following, the first embodiment will be described as a specific example to which this contrivance has been made.

<Planar Configuration of Sensor Element>

Figure 2:
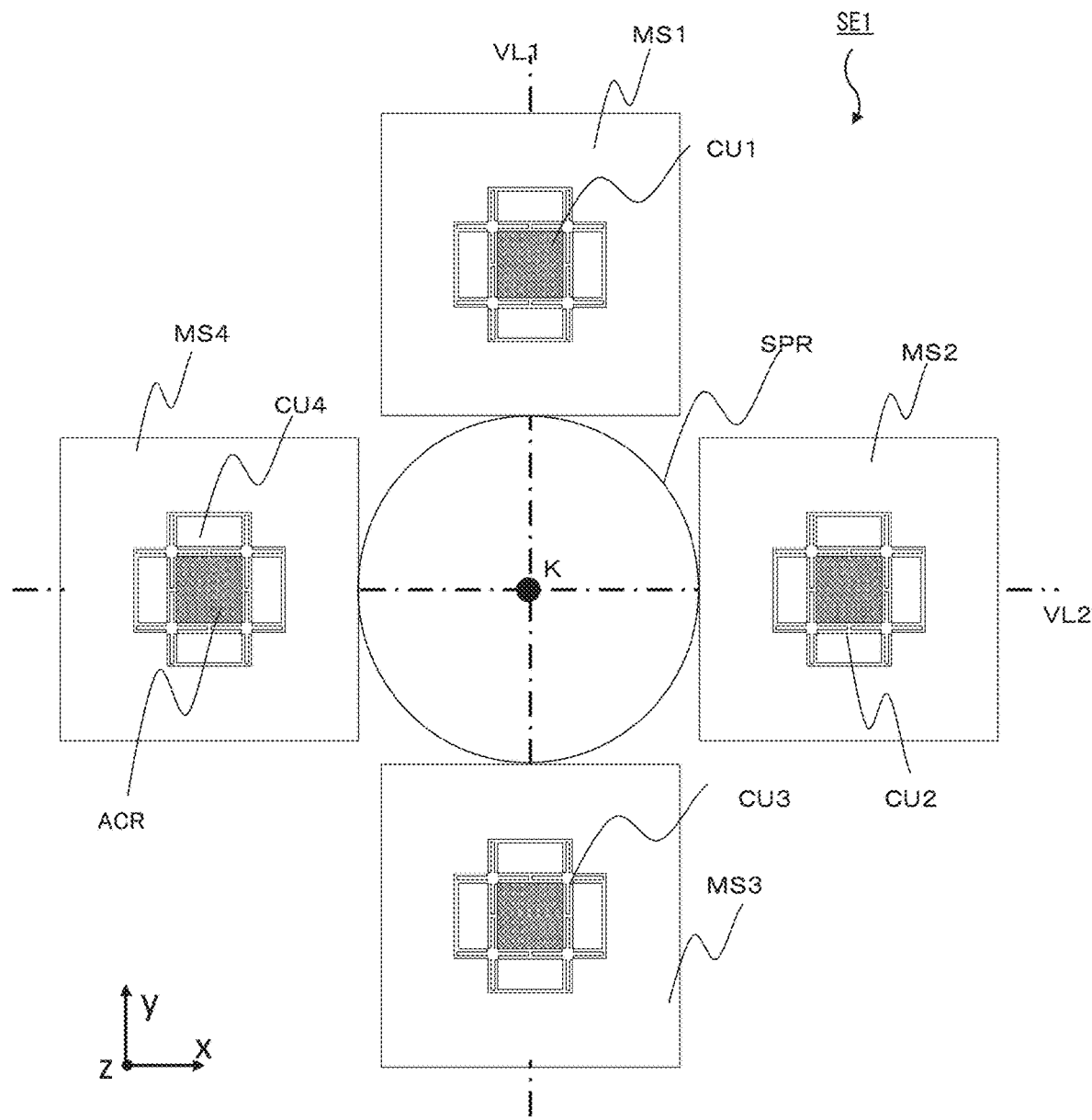
FIG. 2 is a plan diagram of a sensor element.

FIG. 2 is a diagram illustrating a planar configuration of the sensor element SE1 constituting the gyroscope according to this embodiment. As illustrated in FIG. 2, the sensor element SE1 of this embodiment includes inertial bodies MS1, MS2, MS3, and MS4. The inertial bodies MS1 to MS4 are paired with the connection units CU1 to CU4 (cross-shaped portions at the centers of the inertial bodies MS1 to MS4), respectively.

The inertial body MS1 and the connection unit CU1, the inertial body MS2 and the connection unit CU2, the inertial body MS3 and the connection unit CU3, and the inertial body MS4 and the connection unit CU4 are mechanically connected, respectively. The fixed portions (anchors) ACR are arranged at the centers of the connection units CU1 to CU4. The fixed portions ACR are colored with gray for the convenience (the same content is applied below).

Although the x, y, and z axes are illustrated for the convenience in the figure, the inertial body MS1 is displaceable in both the x direction and the y direction perpendicular to the x direction. The connection unit CU1 for displacing the inertial body MS1 in both the x direction and the y direction perpendicular to the x direction will be described in detail with reference to FIG. 3. Similarly, the inertial bodies MS2, MS3, and MS4 are also displaceable in the x and y directions. In addition, the inertial bodies MS1, MS2, MS3, and MS4 are mechanically connected by the ring-shaped elastic body SPR as a coupling spring.

The planar shapes of the inertial bodies MS1, MS2, MS3, and MS4 are identical and are, for example, a quadrangular shape as illustrated in FIG. 2. However, the shape is not limited to a quadrangular shape, and the shape may be a disc shape, a triangular shape, a trapezoid shape, or a fan shape. It is preferable that the masses of the inertial bodies MS1, MS2, MS3, and MS4 be configured to be identical.

With respect to the arrangement of the inertial bodies MS1 to MS4, in the example of FIG. 2, the inertial bodies MS1 to MS4 are arranged in the vicinity of point symmetrical positions in the plane. For example, the inertial bodies MS1 and MS3 are symmetrically arranged in the diametric direction VL1 with respect to the center K of the ring-shaped elastic body SPR, and the inertial bodies MS2 and MS4 are symmetrically arranged in the diametric direction VL2 perpendicular to the diametric direction VL1. Similarly, the connection units CU1 to CU4 are also arranged in the vicinity of point symmetrical positions in the xy plane. In addition, as illustrated in the example of FIG. 2, the inertial bodies MS1 to MS4 are arranged in an evenly spaced manner in the circumferential direction of the ring-shaped elastic body SPR.

That is, the sensor element SE1 according to this embodiment includes an inertial body MS1 that is displaceable in any one of the x direction and the y direction, an inertial body MS2 that is displaceable in any one of the x direction and the y direction, an inertial body MS3 that is displaceable in any one of the x direction and the y direction, an inertial body MS4 that is displaceable in any one of the x direction and the y direction, a connection unit CU1 that connects the inertial body MS1, a connection unit CU2 that connects the inertial body MS2, a connection unit CU3 that connects the inertial body MS3, a connection unit CU4 that connects the inertial body MS4, and an elastic body SPR that mechanically connects the inertial bodies MS1, MS2, MS3, and MS4.

<X-Y Decoupling Spring System>

Next, the configuration of the connection units CU1 to CU4 will be described. Herein, since the connection units CU1 to CU4 are configured to have the same configuration, the connection units CU1 to CU4 will be described as the connection units CU. In addition, since the inertial bodies MS1 to MS4 are configured to have the same configuration, the inertial bodies MS1 to MS4 will be described as the inertial bodies MS.

Figure 3:
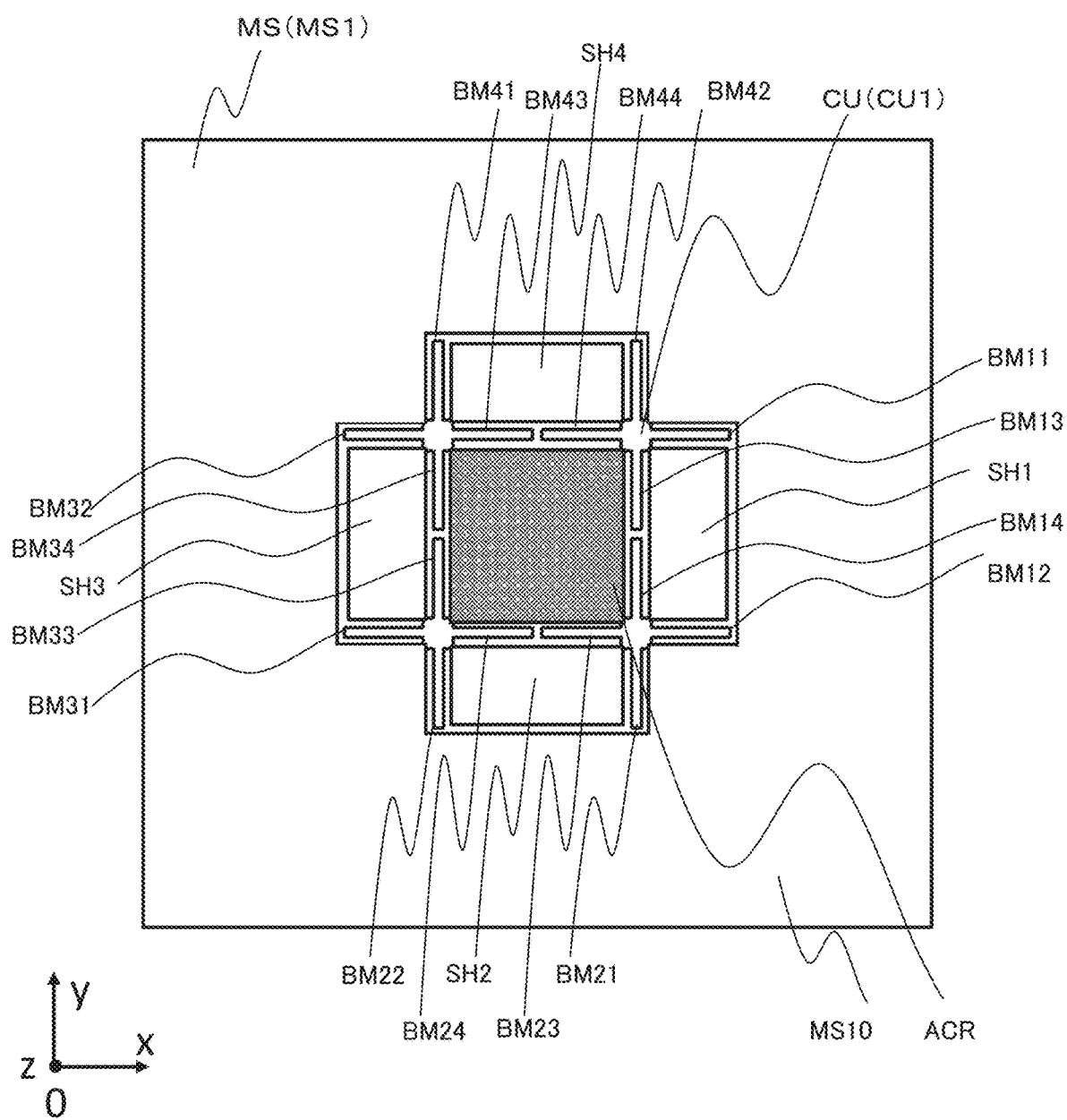
FIG. 3 is a schematic diagram illustrating a conceptual planar structure of connection units and an inertial body.

FIG. 3 is an example of a schematic diagram illustrating a conceptual planar structure of the connection unit CU and the inertial body MS in this embodiment. An X-Y decoupling spring system (X-Y spring structure) that allows the inertial body MS to be displaceable in both the x direction and the y direction in FIG. 3 will be described. For the convenience, in the present specification including FIG. 3 and the like, the xyz direction are defined as indicated by the arrows in the figure. For the convenience, the z direction is set to positive on the front side with respect to the paper surface.

In FIG. 3, for example, a fixed portion (anchor) ACR having a quadrangular shape is arranged in the central portion of the connection unit CU, shuttles SH1 to SH4 having a quadrangular shape are arranged so as to interpose the anchor ACR. An inertial body MS is arranged outside the shuttles SH1 to SH4. It is preferable that the center of gravity of the anchor ACR is allowed to coincide with the vicinity of center of gravity of the inertial body MS and the entire connection units CU.

As illustrated in FIG. 3, the anchor ACR and the shuttle SH1 are mechanically connected by the beam BM13 and the beam BM14, the anchor ACR and the shuttle SH2 are mechanically connected by the beam BM23 and the beam BM24, the anchor ACR and the shuttle SH3 are mechanically connected by the beam BM33 and the beam BM34, and the anchor ACR and the shuttle SH4 are mechanically connected by the beam BM43 and the beam BM44.

In addition, the shuttle SH1 and the inertial body MS are mechanically connected by the beam BM11 and the beam BM12, the shuttle SH2 and the inertial body MS are mechanically connected by the beam BM21 and the beam BM22, and the shuttle SH3 and the inertial body MS are mechanically connected by the beam BM31 and the beam BM32, and the shuttle SH4 and the inertial body MS are mechanically connected by the beam BM41 and the beam BM42.

Heretofore, as illustrated in FIG. 3, the connection unit CU in this embodiment includes an anchor ACR fixed to the substrate, shuttles SH1, SH2, and SH3, and SH4 provided between the anchor ACR and the inertial body MS. In addition, the beams BM mechanically connecting the anchor ACR and the shuttle SH or mechanically connecting the shuttle SH and the inertial body MS are included.

Subsequently, as illustrated in FIG. 3, the beams BM11, BM12, BM13, and BM14, the beams BM21, BM22, BM23, and BM24, the beams BM31, BM32, BM33, and BM34, and the beams BM41, BM42, BM43, and BM44 are in a point symmetrical relationship with the anchor ACR. These beams basically have the same structure. Alternatively, the beams BM11, BM12, BM21, BM22, BM31, BM32, BM41, and BM42 are configured with the same structure having the spring coefficient K1, and the beams BM13, BM14, BM23, BM24, BM33, BM34, and BM43 are configured with the same structure having the spring coefficient K2. It is preferable that the spring coefficient K1 is smaller than the spring coefficient K2. That is, the spring coefficient K1 is softer than the spring coefficient K2. Hereinafter, representatively, the beams BM11 to BM14 will be described as an example of a decoupling spring.

The beams BM11, BM12, BM13, and BM14 have, for example, a U-shaped spring shape as illustrated in FIG. 3. In this embodiment, the beams BM11 and BM12 are configured so as to be easily elastically deformed in the y direction and hardly elastically deformed in the x direction. In addition, the beams BM13 and BM14 are configured so as to be easily elastically deformed in the x direction and hardly elastically deformed in the y direction. The beams BM31 to BM34 arranged symmetrically with the beams BM11 to BM14 with respect to the anchor ACR have elastic deformation characteristics similar to those of the beams BM11 to BM14.

Then, the beams BM21 and BM22 are configured so as to be easily elastically deformed in the x direction and hardly elastically deformed in the y direction. In addition, the beams BM23 and BM24 are configured so as to be easily elastically deformed in the y direction and hardly elastically deformed in the x direction. The beams BM41 to BM44 arranged symmetrically with the beams BM21 to BM24 with respect to the ACR have elastic deformation characteristics similar to those of the beams BM21 to BM24. The shapes of the beams BM11 to 44 are not limited to the U shape and may be an I shape, a W shape, or the like.

In addition, the inter-beam shuttle SH11, SH12, SH13, and SH14 are provided at symmetrical positions with respect to the anchor ACR. In this embodiment, the shape is a quadrangular shape, but the shape is not limited to the quadrangular shape.

When the inertial body MS is to be displaced in the positive y direction, the elastic deformation of the beams BM13, BM14, BM33, and BM34 connected to the anchor ARC, the beams BM41 and BM42 connected to the shuttle SH4, and the beams BM21 and BM22 connected to the shuttle SH2 is small. Therefore, the shuttles SH1 and SH3 are fixed to the anchor ACR and are not substantially displaced, whereas the shuttles SH2 and SH4 are displaced to the same degree as the inertial body MS. Therefore, the beams BM11 and BM32 connected to the inertial body MS are expanded to the same extent as the beams BM43 and BM44 connected to the anchor ACR, while the beams BM12 and BM31 connected to the inertial body MS are compressed to the same extent as the beams BM23 and BM24 connected to the anchor ACR.

That is, when the inertial body MS is excited in the y direction, the elastic deformation of the beams BM11, BM12, BM23, BM24, BM31, BM32, BM43, and BM44 largely occurs in the y direction, and the elastic deformation of the beams BM13, BM14, BM21, BM22, BM33, BM34, BM41, and BM42 is small. When the inertial body MS is excited in the x direction, the elastic deformation of the beams BM13, BM14, BM21, BM22, BM33, BM34, BM41, and BM42 largely occurs in the x direction, and the elastic deformation of the beams BM11, BM12, BM23, BM24, BM31, BM32, BM43, and BM44 is small.

In this manner, the beams BM11 to BM14, the beams BM21 to BM24, the beams BM31 to BM34, and the beams BM41 to BM42 have respective elastic deformation characteristics in the x direction or the y direction, and due to the arrangement of the shuttles SH11 to SH14, the elastic beams corresponding to the displacement in the x direction and the elastic beams corresponding to the displacement in the y direction are allowed to be independent of each other, so that it is possible to obtain an effect of reducing the quadrature error. That is, the vibrations in the x direction and the y direction can be decoupled. Furthermore, the width of the inter-beam shuttle can be adjusted, and thus, by setting the width to the minimum width, there is an advantage of maximizing the effective area of the mass. In addition, as will be described later, vibrations in the x direction and the y direction can be separated and detected by the capacitive elements.

Furthermore, if the configurations of the elastic beams in the x direction and the y direction are the same, the spring constant kx at the time of the resonance in the x direction and the spring constant ky at the time of the resonance in the y direction of the inertial body MS are equal to each other. Furthermore, since the inertial bodies have the same mass at the time of the resonance in the x direction and the resonance in the y direction, the resonance frequency fx in the x direction and the resonance frequency fy in the y direction are equal to each other. Herein, the definition of each variable is as follows.

Square root of f=(k/M)
f: Resonance frequency
k: Spring constant of beam BM
M: Mass of inertial body MS <Degenerate mode of Ring-shaped Coupling Spring>

Next, the coupling mode between the inertial bodies MS1, MS2, MS3 and MS4 will be described. As illustrated in FIG. 2, the inertial bodies MS1 to MS4 are mechanically connected by a ring-shaped elastic body (ring-shaped coupling spring) SPR. Vibration of the ring-shaped coupling spring SPR has a cos2θ ($\theta=45°$) resonance mode and a degenerate mode of the ring vibration structure. In this embodiment, the inertial bodies MS1 to MS4 illustrated in FIG. 2 are connected in the vicinity of the antinodes of the resonance mode of $\theta=45°$ of the ring-shaped coupling spring SPR in order to increase the sensitivity. That is, the inertial bodies MS1 to MS4 are connected near the antinode AD(0) illustrated in FIG. 1B. Since four points as the antinodes AD(0) are at point symmetric positions, these points are hereinafter referred to as AD1, AD2, AD3, and AD4.

FIGS. 4A to 4C illustrate schematic diagrams of an example of the inflection pattern of the ring-shaped coupling spring SPR when the inertial bodies MS1 to MS4 and the ring-shaped coupling spring SPR resonate. The amplitude of the vibration is greatly exaggerated. First, details of the resonance vibration modes of the inertial bodies MS1 to MS4 and the ring-shaped spring SPR will be described.

The inertial bodies MS1, MS2, MS3, and MS4 are connected to the respective positions of the antinodes AD1, AD2, AD3, and AD4 having the maximum vibration amplitude of the ring-shaped coupling spring SPR (antinodes are not illustrated because of complication). In one resonance mode, as illustrated in FIG. 4A, the inertial bodies MS1 and MS3 vibrate in the y direction, and the vibration phases of these vibrations are shifted by 180°. In addition, the inertial bodies MS2 and MS4 vibrate in the x direction, and the vibration phases of these vibrations are shifted by 180°. That is, the inertial bodies MS1 to MS4 vibrate in the radial direction, and the resonance frequency is denoted by fr.

In addition, when the inertial bodies MS1 and MS3 reach the maximum amplitude in the y direction (outward direction of the ring), the inertial bodies MS2 and MS4 reach the maximum amplitude in the x direction (inward direction of the ring). That is, as illustrated in FIG. 4B, when the inertial bodies MS1, MS3 are at the maximum distance from the center K, the inertial bodies MS2, MS4 are at the minimum distance from the center K. On the other hand, as illustrated in FIG. 4C, when the inertial bodies MS1 and MS3 are at the minimum distance from the center K, the inertial bodies MS2 and MS4 are at the maximum distance from the center K.

FIGS. 4D to 4F illustrate schematic diagrams of an example of the inflection pattern of the ring-shaped coupling spring SPR when the inertial bodies MS1 to MS4 and the ring-shaped coupling spring SPR resonate. The mode illustrated in FIGS. 4D to 4F is a degenerate mode, and the resonance frequency is denoted by fd.

As described with reference to FIGS. 1A and 1B, the antinodes AD1 to AD4 in FIGS. 4A to 4C become the nodes ND1 to ND4 in FIGS. 4D to 4F at the time of resonating in the degenerate mode. Since four points as the nodes ND(45) are at point symmetric positions, these points are hereinafter referred to as ND1, ND2, ND3, and ND4. That is, ND1, ND2, ND3, and ND4 are at the minimum amplitude position. However, since the inertial bodies MS1 to MS4 are mechanically connected to the ring spring SRP, the inertial bodies MS1 to MS4 generate vibrations as illustrated in FIGS. 4D to 4F.

Details of the shape of the vibration in the degenerate mode will be described with reference to FIGS. 4D to 4F. The inertial bodies MS1 and MS3 vibrate in the x direction, and these vibration phases are shifted by 180°. Then, the inertial bodies MS2 and MS4 vibrate in the y direction perpendicular to the x direction, and these vibration phases are shifted by 180°.

That is, as illustrated in FIGS. 4D to 4F, the inertial bodies MS1 to MS4 vibrate in the circumferential direction, and the inertial bodies MS1 to MS4 reach the maximum amplitude position at the same time. Furthermore, as illustrated in FIG. 4E, when the inertial bodies MS1 and MS3 have the maximum amplitude in the counterclockwise direction, the inertial bodies MS2 and MS4 have the maximum amplitude in the clockwise direction. Furthermore, as illustrated in FIG. 4F, when the inertial bodies MS1 and MS3 have the maximum amplitude in the clockwise direction, the inertial bodies MS2 and MS4 have the maximum amplitude in the counterclockwise direction.

In the ideal state, the resonance frequency fd of the degenerate mode coincides with the resonance frequency fr of the resonance mode. The frequency fd of the resonance mode illustrated in FIGS. 4A to 4c can coincide with the frequency fr of the resonance mode illustrated in FIGS. 4D to 4F by adjusting the inner diameter and the thickness of the ring-shaped coupling spring SPR. That is, even when the inertial bodies MS1 to MS4 are connected, the structure having the ring-shaped coupling spring and the inertial bodies MS1 to MS4 can realize the resonance mode and the degenerate mode.

Furthermore, depending on the vibration mode established by the geometric shape of the ring-shaped coupling spring SPR and the frequencies of all excitation signals applied by the driving vibration unit (comb-tooth-shaped electrode) described later, the number of each of the nodes and the antinodes may be larger than or smaller than four illustrated in FIGS. 4A to 4F.

Figure 4G:
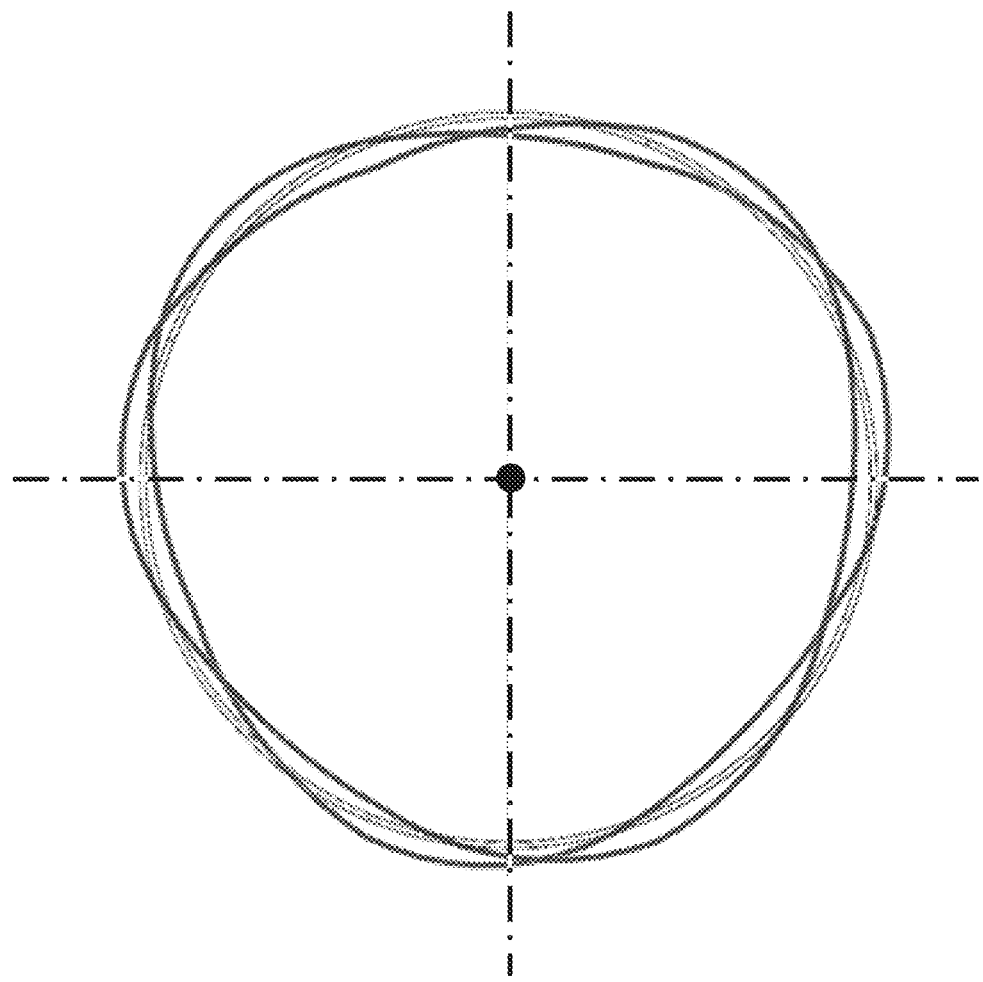
FIG. 4G is a schematic diagram of an example of a mode in which the number of nodes and the number of antinodes are larger than four, respectively.

FIG. 4G is a schematic diagram of an example of a mode in which the number of nodes and antinodes is larger than four. For example, as illustrated in FIG. 4G, there are six nodes and six antinodes when θ=30°. In this case, the arrangement and the number of inertial bodies MS may be the same as those in FIGS. 4A to 4C. The resonance frequencies fx and fy of the inertial body in the two directions which are perpendicular directions are determined by the resonance frequency of the ring-shaped coupling spring. Therefore, the resonance mode frequency fr and the degenerate-mode resonance frequency fd can be more easily matched with each other, and frequency deviation due to variations in processing can be reduced, so that it is possible to the effect of reducing noise.

<Example of Connection Unit>

FIGS. 5A and 5B are plan diagrams illustrating an example of a structure of a connection unit between the ring-shaped coupling spring SPR and the inertial body MS. In FIGS. 5A and 5B, only a portion of the ring-shaped coupling spring SPR is illustrated. In this example, the beam-shaped connection unit 501 illustrated in FIG. 5A has a cross-sectional area smaller than the cross-sectional area of the ring-shaped coupling ring SPR, and the influence of the resonance mode and degenerate mode of the ring-shaped coupling spring SPR is reduced.

In addition, since a rectangular connection unit 502 illustrated in FIG. 5B is deformable in the X direction and the Y direction, it can be expected to suppress rotation of the inertial body MS in the xy plane. For example, as illustrated in FIGS. 4D to 4F, when the inertial bodies MS1 to MS4 vibrate in a clockwise direction, by connecting the inertial bodies MS1 to MS4 with the rectangular spring as illustrated in FIG. 5B, a force for rotating the inertial bodies MS1 to MS4 can be suppressed. Therefore, it is possible to allow the locus of the resonance vibration of each inertial body MS to be close to linear vibration along the x direction and the y direction.

If these resonance frequencies are excited in one of the modes close to each other and rotated about the axis (z axis) perpendicular to the plane of the ring-shaped coupling spring SPR, the Coriolis force can be directly exchanged for the other axis (sensing axis). Furthermore, a bias can be reduced by periodically alternating the sensing axes.

In addition, in principle, it is preferable that the ring-shaped coupling spring SPR is a perfect circle. However, an allowable error of the accuracy of an ordinary MEMS is assumed to be within an assumed range. In addition, as well known, polygons can be approximated to circles, and thus, the polygons are not excluded. For example, a polygon of which length of one side is equal to or smaller than the width a of the beam-shaped connection unit 501 illustrated in FIG. 5A may be considered to be substantially the same as a circle. In addition, if the relationship with the width D of the coupling spring SPR is considered, a polygon that is equal to or smaller than the width D may be considered to be substantially the same as a circle. In this application, a polygon which can be approximated to such a circle is also referred to as a "circle", a "circular ring", or a "ring".

<Principle of Angle Detection>

As described above, if the ring-shaped coupling spring SPR is excited to one of the modes (driving vibration axis) and rotated about the axis (z axis) perpendicular to the plane of the ring-shaped coupling spring SPR, the energy of Coriolis force can be converted into another mode (sensing vibration axis). A pair of such a vibration mode and the degenerate vibration mode can have the same resonance frequency, and thus, in order to maintain essentially an equilibrium state, the driving vibration axis and the sensing vibration axis can be exchanged with each other. Therefore, it is possible to directly measure the angle.

An angle detection method will be described With reference to FIG. 6. The driving vibration axes of the inertial bodies MS1 to MS4 are indicated by solid arrows 61. In addition, the vibration shape of the ring-shaped coupling spring is indicated by a solid line. Then, when the rotational acceleration Ω is generated around the z-axis and the vibration shape of the ring-shaped coupling spring is deformed as indicated by a dotted line, if energy is exchanged from the driving vibration axis to the sensing vibration axis, the vibration axes of the inertial bodies MS1 to MS4 are changed as the arrow 62 indicated by a dotted line. The angle between the driving vibration axis and the new vibration axis is the rotation angle θ. Therefore, by measuring the angle between the driving vibration axis 61 and the new vibration axis 62 by using the device described in the above embodiment, it is possible to directly detect the rotation angle θ.

<Capacitive Element>

Subsequently, a capacitive element for measuring the rotation angle by the sensor element SE1 according to this embodiment will be described.

Figure 7:
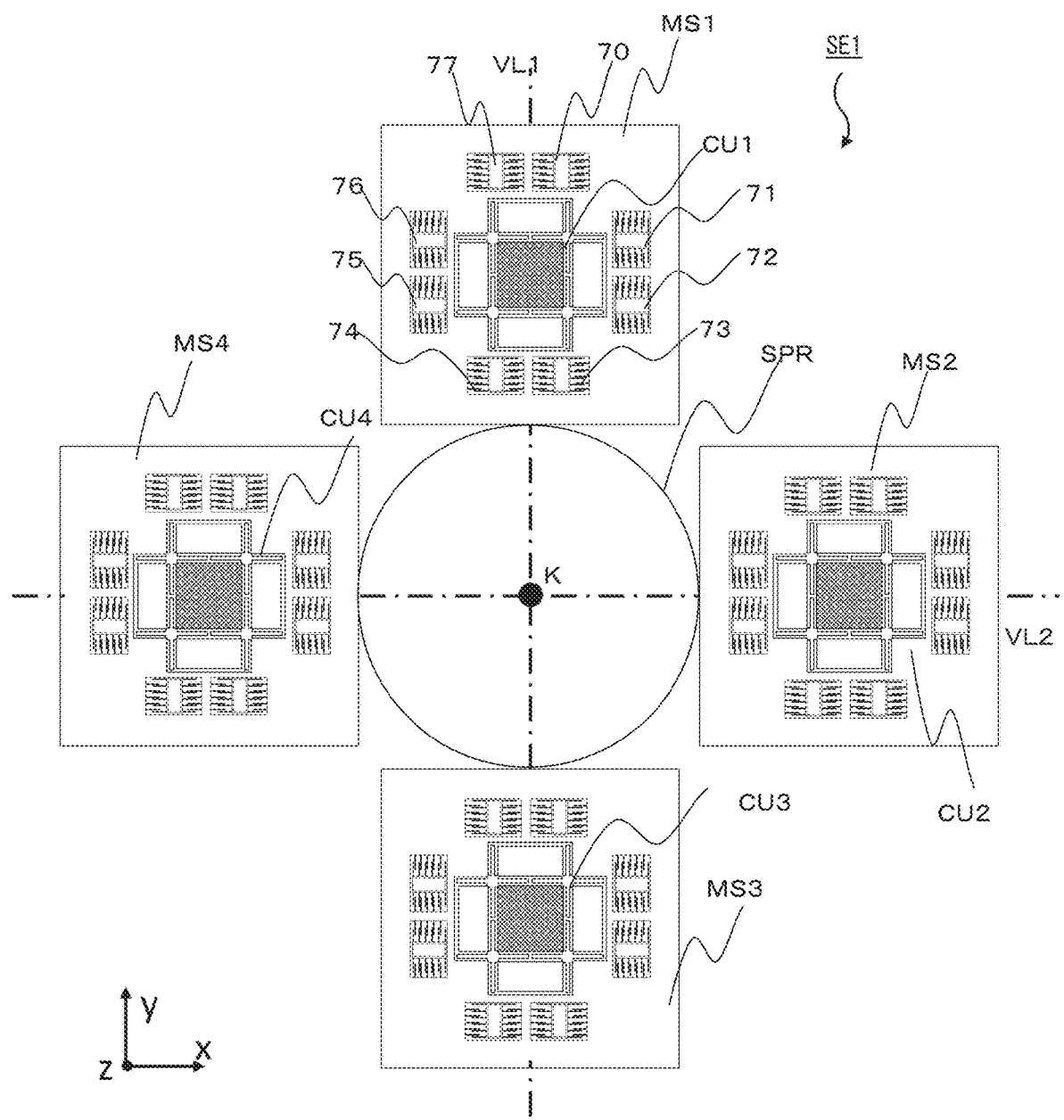
FIG. 7 is a plan diagram illustrating an arrangement example of capacitive elements on a sensor element.

FIG. 7 is a plan diagram illustrating an arrangement example of capacitive elements on the sensor element SE1. As illustrated in FIG. 7, a plurality of capacitive elements 70 to 77 are formed in the inertial bodies MS1 to MS4. More specifically, as illustrated in FIG. 7, when the capacitive elements 70, 73, 74, and 77 are formed on the virtual line VL1 extending in the y direction of the connection unit CU1 of the inertial body MS1, among these capacitive elements, for example, the capacitive elements 70 and 74 can be used as capacitive elements that function as driving vibration units, and for example, the capacitive elements 73 and 77 can be used as capacitive elements that function as monitor units or detection units (sensor units). In the configuration of FIG. 7, since each capacitive element is not a center object with respect to the anchor, it is preferable to provide the two driving vibration units and the two sensor units in each of the x and y directions so as not to generate rotation. Alternatively, an element may be used as an element functioning as a driving vibration unit and an element functioning as a sensor unit. In addition, if the capacitive elements 71, 72, 75, and 76 are formed on the virtual line VL2 extending in the x direction, similarly, a capacitive element functioning as a driving vibration unit and a capacitive element functioning as a sensor unit can be formed. As is well known, the capacitive element can be driven by supplying electric power and thus, can be a driving vibration unit. In addition, the capacitive element can be a monitor or a detection unit that detects an external force such as vibration as capacitance change.

In the arrangement of the driving unit and the sensor unit, at least one driving unit and at least one sensor unit may be in one direction. However, it is preferable not to change the center of gravity of the inertial body MS in the arrangement. It is also preferable that the arrangement is point symmetric with respect to the center K.

Similarly, in the inertial bodies MS2, MS3 and MS4, a capacitive element that functions as a similar driving vibration unit and a capacitive element that functions as a similar sensor unit are formed. The arrangement and the shape of the capacitive elements illustrated in FIG. 7 are merely examples, and the present invention is not limited thereto.

Figure 8:
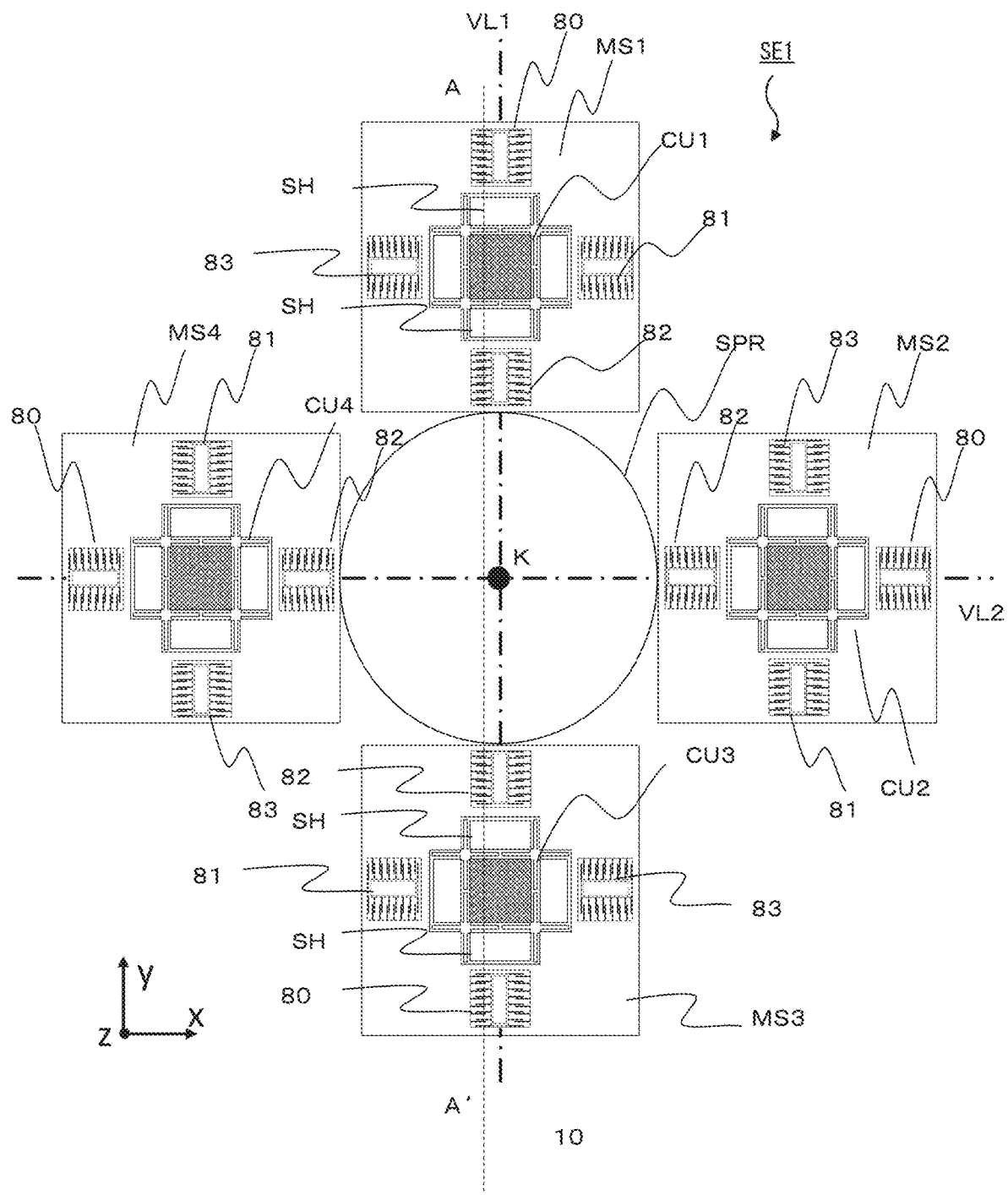
FIG. 8 is a plan diagram illustrating another arrangement example of capacitive elements on a sensor element.

FIG. 8 is a plan diagram illustrating another arrangement example of the capacitive element on the sensor element SE1. In the example of FIG. 8, four capacitive elements 80 to 83 are arranged for each inertial body MS. For example, the capacitive element 80 of the inertial body MS1 and the capacitive element 80 of the inertial body MS3 are used as the driving vibration units to generate vibration along the VL1 axis through the coupling. The capacitive element 82 of the inertial body MS1 and the capacitive element 82 of the inertial body MS3 can be used as capacitive element that functions as a monitor section. Then, the capacitive elements 81 and 83 are formed on the virtual line VL2 extending in the X direction, those can be capacitive elements that function as detection units (sensor units). Similarly, the capacitive elements of the inertial bodies MS2 and MS4 can constitute the capacitive element 80 for the driving vibration unit, the capacitive element 82 for the monitor unit, and the capacitive elements 81 and 83 for detection unit. Then, it is possible to drive a vibration mode according to VL1. On the other hand, an example of driving a degenerate mode will be described. The capacitive element 81 of the inertial body MS1, the capacitive element 83 of the inertial body MS2, the capacitive element 81 of the inertial body MS3, and the capacitive element 83 of the inertial body MS4 are used as the driving vibration unit, and vibrations are performed along 45° of the VL1 axis. Then, the capacitive element 83 of the inertial body MS1, the capacitive element 81 of the inertial body MS2, the capacitive element 83 of the inertial body MS3, and the capacitive element 81 of the inertial body MS4 are used as monitor units. Then, the capacitive elements 80 and 82 of the inertial bodies MS1 to MS4 may be used as capacitive elements that function as detection units (sensor units). By using a lateral comb-tooth shape for the driving vibration unit, it is possible to lower the voltage at the time of driving the same amplitude in comparison with a paralleled comb-tooth shape, so that power consumption becomes low.

As described above, since the sensor element SE1 of the gyroscope according to this embodiment is configured, it is possible to measure excitation and displacement in the respective direction of the circumferential direction and the circle radial direction. In addition, in the arrangement of the capacitive elements in each of the inertial bodies MS1 to MS4, the capacitive elements are distinguished by reference numerals 80 to 83 in a clockwise direction from the top as viewed from the ring center K.

<Cross-Sectional Configuration of Sensor Element in First Embodiment>

Next, a cross-sectional configuration of the sensor element SE1 of the gyroscope according to the first embodiment will be described.

Figure 9:
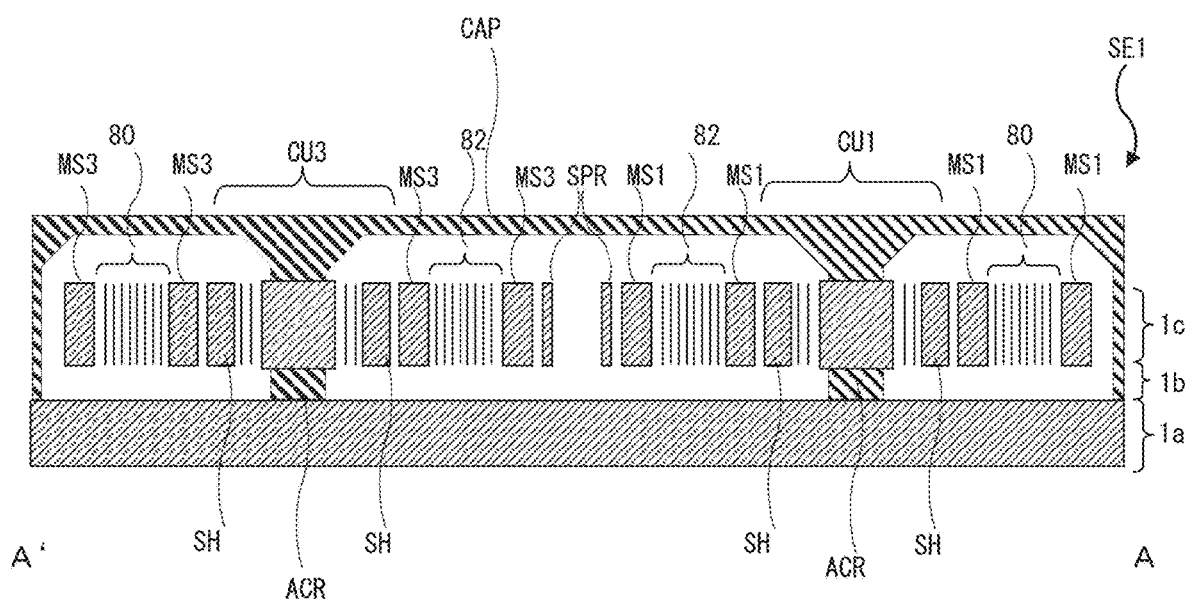
FIG. 9 is a cross-sectional diagram taken along line A-A' of FIG. 8.

FIG. 9 is an example in which the sensor element SE1 illustrated in FIG. 8 is configured as a device by a semiconductor technology and is a cross-sectional diagram taken along the line A-A' in FIG. 8. As illustrated in FIG. 9, the sensor element SE1 in this embodiment has a silicon-on-insulator (SOI) substrate having a substrate layer 1a, an insulating layer 1b, and a device layer 1c. As illustrated in FIG. 9, the insulating layer 1b is removed except for portions connected to a portion (anchor ACR) of the connection unit CU1 and a portion (anchor ACR) of the connection unit CU3. Therefore, in the A-A' cross section, the device layer 1c has a structure floating from the substrate layer 1a, and the inertial body MS1, the inertial body MS3, the connection unit CU1, the connection unit CU3, and the capacitive elements 80 and 82 which are to be the driving vibration unit and the sensor unit are formed. On the other hand, the anchor ACR is fixed to the substrate layer 1a.

More specifically, as illustrated in FIG. 9, the inertial body MS1 is connected to the connection unit CU1, and the capacitive elements 80 and 82 which are to be the driving vibration unit and the sensor unit are formed inside the inertial body MS1. An inertial body MS3 is arranged on a connection unit CU3 arranged symmetrically with the connection unit CU1 with the ring-shaped coupling spring SPR being interposed. In addition, the capacitive elements 80 and 82 which are to be a driving vibration unit and a sensor unit are formed inside the inertial body MS3.

The processing of such a device layer 1c can be realized by using, for example, a photolithography technique and an etching technique. The processing of the insulating layer 1b can also realized by etching technique by providing through holes in elements for example, the inertial bodies MS, the shuttles SH, and the ring-shaped coupling spring SPR other than the anchor ACR of the device layer 1c. As illustrated in FIG. 9, a cap CAP is provided so as to cover the processed device layer 1c, and the device layer 1c processed in the hermetically sealed space interposed between the cap CAP and the substrate layer 1a is arranged. It is preferable that the pressure of the hermetically sealed space is set to a degree of vacuum at which energy loss due to damping is sufficiently suppressed. In addition, it is preferable that the cap CAP and the anchor ACR are also fixed.

As described above, the sensor element SE1 of the gyroscope according to this embodiment has a cross-sectional configuration. In the above description, the cross-section in the y direction in FIG. 8 has been described, but the same is applied to the x direction.

<Driving Vibration>

Next, the configuration of the driving vibration unit will be described with reference to FIGS. 10A to 10F. The driving vibration unit can be configured with the capacitive elements 70 to 77 of FIG. 7 or the capacitive elements 80 to 83 of FIG. 8. Hereinafter, the driving vibration unit 10 will be described by taking the configuration of FIG. 8 as an example. In FIG. 8, the y direction of the inertial bodies MS1 and MS3 and the x direction of the inertial bodies MS2 and MS4 are referred to as the radial direction, and the x direction of the inertial bodies MS1 and MS3 and the y direction of the inertial bodies MS2 and MS4 are referred to as the circumferential direction (tangential direction of the circumference). The vibration in the circumferential direction is parallel vibration along the tangential direction not rotational vibration with respect to the center of the circle.

In FIG. 8, as described above, for example, the capacitive elements 80 and 83 are used as the driving vibration units, and the capacitive elements 81 and 82 are used as the sensor units. In that case, the capacitive element provided inside the inertial body MS1 is provided as a driving vibration unit 10r for allowing the inertial body MS1 to be driven to vibrate in the radial direction. In addition, the capacitive element 83 provided inside the inertial body MS1 is provided as a driving vibration unit 10c for allowing the inertial body MS1 to be driven to vibrate in the circumferential direction. The same is applied to the other inertial bodies MS2 to MS4.

Herein, since the driving vibration unit 10r and the driving vibration unit 10c have the same configuration except that the arrangement directions are different by 90°, the driving vibration unit 10r will be taken as the driving vibration unit 10, and the description will be made.

Figure 10A:
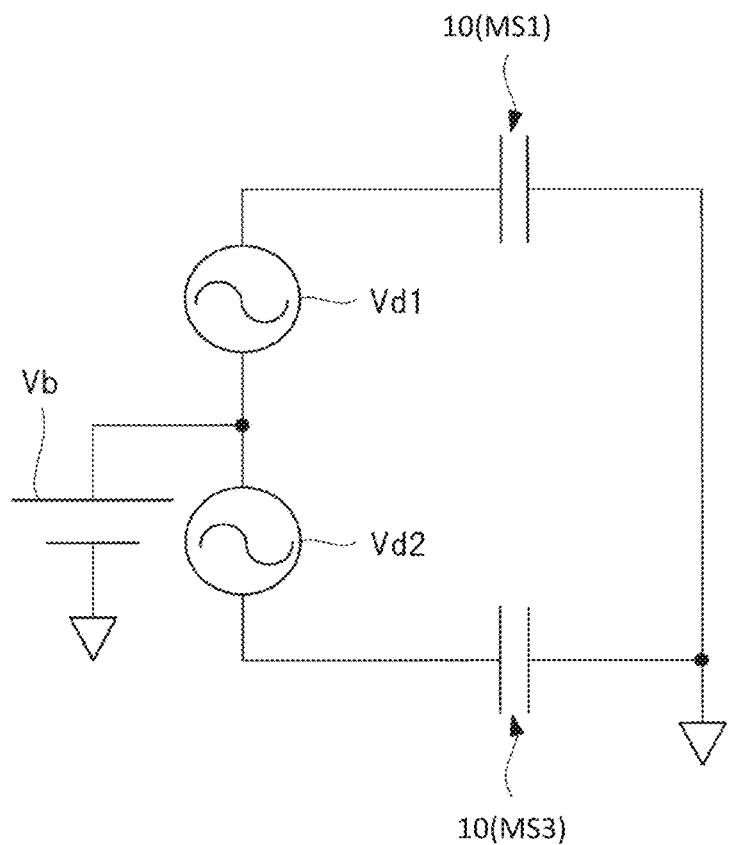
FIG. 10A is a circuit diagram illustrating a configuration of a driving vibration unit.

FIG. 10A is a diagram illustrating a circuit configuration for driving and vibrating the inertial bodies MS1 to MS4 by using the driving vibration units 10r (capacitive elements 80) of the inertial bodies MS1 and MS3 in the embodiment of FIG. 8. In the circuit configuration illustrated in FIG. 10A, the inertial body MS1 and the inertial body MS3 are driven to vibrate in opposite phases (out of phase). Then, the inertial body MS2 and the inertial body MS4 are driven to vibrate in opposite phases (out of phase). Furthermore, the vibration modes of the inertial bodies MS1 and MS3 and the vibration modes of the inertial bodies MS2 and MS4 may be driven to vibrate in opposite phases (out of phase).

In FIG. 10A, since the inertial bodies MS1 to MS4 have the same electrical connection, the inertial bodies MS1 and MS3 will be described as an example. The inertial bodies MS1 and MS3 are electrically grounded, and the DC power supply Vb is connected to the driving vibration unit 10 formed inside the inertial body MS1 and the driving vibration unit 10 formed inside the inertial body MS3. In the example of FIG. 8, the driving vibration unit 10 is configured with the capacitive element 80 of each of the inertial bodies MS1 and MS3. One electrode (movable electrode) of the driving vibration unit 10 is electrically connected to GND, and the other electrode (fixed electrode) of the driving vibration unit 10 is connected to the DC power supply Vb.

Furthermore, as illustrated in FIG. 10A, an AC power supply Vd1 is connected to the driving vibration unit 10 formed inside the inertial body MS1, and an AC power supply Vd2 is connected to the driving vibration unit 10 formed inside the inertial body MS3. Then, an electrostatic force based on the AC voltage supplied from the AC power supply Vd1 is generated in the driving vibration unit 10 of the inertial body MS1 configured with the capacitive element, and an electrostatic force based on the AC voltage supplied from the AC power supply Vd2 is generated in the driving vibration unit of the inertial body MS3 configured with the capacitive element. At this time, the AC voltage supplied from the AC power supply Vd to the driving vibration unit 10 of the inertial body MS1 and the AC voltage supplied from the AC power supply Vd2 to the driving vibration unit 10 of the inertial body MS3 have opposite phases (the phases are different by 180°). Therefore, the direction of the electrostatic force generated in the driving vibration unit 10 of the inertial body MS1 and the direction of the electrostatic force generated in the driving vibration unit 10 of the inertial body MS3 are opposite to each other, and as a result, the inertial body MS1 and the inertial body MS3 vibrate in opposite phases.

Figure 10B:
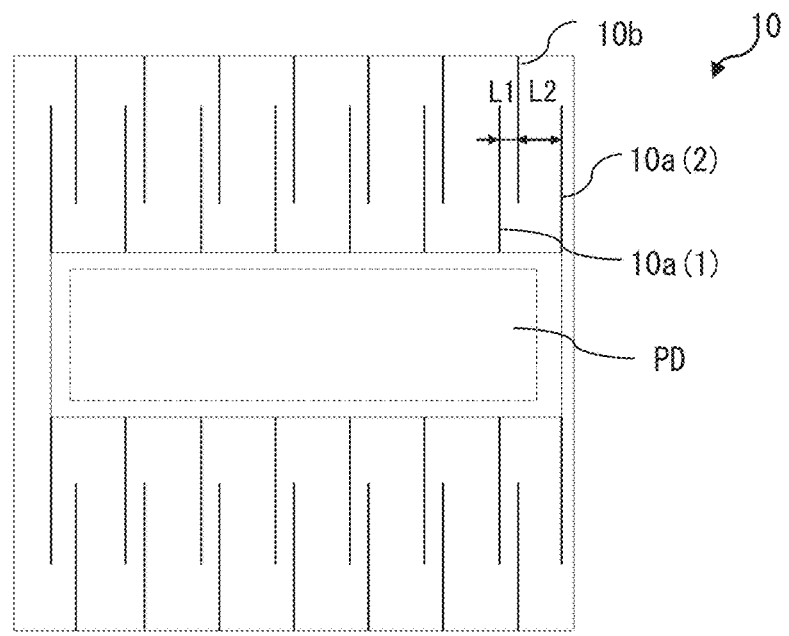
FIG. 10B is a schematic diagram illustrating a configuration of a driving vibration unit.

FIG. 10B is a schematic diagram illustrating a configuration example of the driving vibration unit 10. As illustrated in FIG. 10B, the driving vibration unit 10 is configured with, for example, a capacitive element of a parallel structure. More specifically, the driving vibration unit 10 has a fixed electrode 10a(1) and a fixed electrode 10a(2) electrically connected to a pad PD that functions as a connection terminal to the outside, and a movable electrode 10b integrally formed with the inertial body MS1 (inertial body MS3) is formed so as to be interposed between the fixed electrode 10a(1) and the fixed electrode 10a(2). At this time, for example, the distance L1 between the fixed electrode 10a(1) and the movable electrode 10b is configured so as to be different from the distance L2 between the fixed electrode 10a(2) and the movable electrode 10b. More specifically, the distance L1 is, for example, about several μm, and the distance L2 is set to a value about three times the distance L1. In a case where the driving vibration unit 10 is configured with the capacitive element illustrated in FIG. 10B, the distance L1 can be shortened, and as a result, the electrostatic force acting between the fixed electrode 10a(1) and the movable electrode 10b can be increased, so that it is possible to obtain high driving efficiency in the capacitive element.

In addition, as illustrated in FIG. 8, a capacitive element 82 as a sensor unit 11r that monitors the displacement (vibration) of the inertial body MS1 in the radial direction is formed inside the inertial body MS1, and a capacitive element 81 as a sensor unit 11c that monitors the displacement (vibration) of the inertial body MS1 in the circumferential direction is formed inside the inertial body MS1. Such a sensor unit 11 is also configured with capacitive elements having the structure illustrated in FIG. 10B.

As illustrated in FIG. 8, similarly to the inertial body MS1, a sensor unit that monitors the displacement (vibration) of the inertial body MS2 in the radial direction is formed inside the inertial bodies MS2 to MS4, and a sensor unit that monitors the displacement (vibration) of the inertial body MS2 in the circumferential direction is formed the inside of the inertial body MS2. Such a sensor unit may also be configured with capacitive elements having the structure illustrated in FIG. 10B.

That is, in order to detect the displacement (vibration) of the inertial bodies MS1 to MS4 in the radial direction or the circumferential direction as a change in electrostatic capacitance value, for example, the sensor unit is configured with the capacitive elements having the structure illustrated in FIG. 10B. Therefore, although the driving vibration unit 10 and the sensor unit 11 can be configured with the capacitive element having the structure illustrated in FIG. 10B, the driving vibration unit and the sensor unit are different in terms of use. That is, in the driving vibration unit 10, a capacitive element is used to generate an electrostatic force between the electrodes to drive and vibrate the inertial bodies MS1 to MS4. On the other hand, in the sensor unit 11, a capacitive element is used to capture the displacement (vibration) of the inertial bodies MS1 to MS4 as a change in electrostatic capacitance and to monitor the change.

<Operations of Sensor Element in Embodiment>

The sensor element SE1 in the first embodiment is configured as described above. Hereinafter, the operations of the sensor element SE1 will be described with reference to the drawings.

FIGS. 10C and 10D are diagrams illustrating a state where the inertial bodies MS1 to MS4 connected by the ring-shaped coupling spring SPR and the connection units CU1 to CU4 are driven to vibrate in the radial direction.

Since the inertial body MS1 is displaceable in the radial direction, the inertial body MS1 is driven to vibrate in the y direction by the driving vibration unit 10r (capacitive element 80) formed inside the inertial body MS1 illustrated in FIG. 8. Similarly, since the inertial body MS3 is also displaceable in the radial direction, the inertial body MS3 is driven to vibrate in the y direction by the driving vibration unit 10r (capacitive element 80) formed inside the inertial body MS3 illustrated in FIGS. 1A and 1B.

Particularly, FIGS. 10C and 10D schematically illustrate a state where the inertial body MS1 and the inertial body MS3 are driven to vibrate in the same phase in the radial direction (the displacements in the y-axis are in opposite phases). That is, as illustrated in FIG. 10C, in a case where the inertial body MS1 is displaced in the −y direction, the inertial body MS3 is displaced in the +y direction. On the other hand, as illustrated in FIG. 10D, in a case where the inertial body MS1 is displaced in the +y direction, the inertial body MS3 is displaced in the −y direction. In this manner, in the first embodiment, the tuning fork structure is configured in the y direction by the inertial body MS1 and the inertial body MS3, and due to the deformation of the connection units CU1 and CU3 and the ring-shaped coupling spring SPR, the operation that the inertial bodies MS1 and the inertial body MS3 are driven to vibrate in opposite phases in the y direction is realized. At the same time, the inertial body MS2 and the inertial body MS4 are configured similarly in a tuning fork structure in the x direction, and the operation of being driven to vibrate in opposite phases in the x direction is realized.

FIGS. 10E and 10F are diagrams illustrating a state where the inertial body MS1 and the inertial body MS4 connected by the connection units CU1 to CU4 are driven to vibrate in the circumferential direction. Since the inertial body MS1 is also displaceable in the x direction, the inertial body MS1 is driven to vibrate in the circumferential direction (the x direction) by the driving vibration unit 10c (the capacitive element 83) formed inside the inertial body MS1 illustrated in FIG. 8. Similarly, since the inertial body MS3 is also displaceable in the circumferential direction, the inertial body MS3 is driven to vibrate in the circumferential direction (the x direction) by the driving vibration unit 10c (the capacitive element 83) formed inside the inertial body MS3 illustrated in FIGS. 1A and 1B.

Particularly, FIGS. 10E and 10F are diagrams schematically illustrating a state where the inertial body MS1 and the inertial body MS3 are driven to vibrate in the same phase in the circumferential direction (opposite phase in the x direction). That is, as illustrated in FIG. 10E, when the inertial body MS1 is displaced in the −x direction, the inertial body MS2 is displaced in the +x direction. On the other hand, as illustrated in FIG. 10F, when the inertial body MS1 is displaced in the +x direction, the inertial body MS2 is displaced in the −x direction. In this manner, in this embodiment, the tuning fork structure is configured in the x direction by the inertial body MS1 and the inertial body MS3 connected to the ring-shaped coupling spring SPR through the connection units CU1 and CU3, and thus, by the deformation of the connection units CU1 and CU3 and the ring-shaped coupling spring SPR, the operations that the inertial body MS1 and the inertial body MS3 are driven to vibrate in opposite phases in the x direction are realized. At the same time, similarly, a tuning fork structure in the y direction is configured by the inertial body MS2 and the inertial body MS4, and thus, the operations that the inertial bodies are driven to vibrate in opposite phases in the y direction are realized.

From the above, according to this embodiment, the driving vibration unit 10r drives the inertial bodies MS1 to MS4 to vibrate in the radial direction, and the driving vibration unit 10c drives the inertial bodies MS1 to MS4 to vibrate in the circumferential direction. Therefore, according to this embodiment, by combining the driving vibration unit 10r and the driving vibration unit 10c, it is possible to drive the inertial body MS1 and the inertial body MS2 to vibrate in arbitrary directions.

Figure 6:
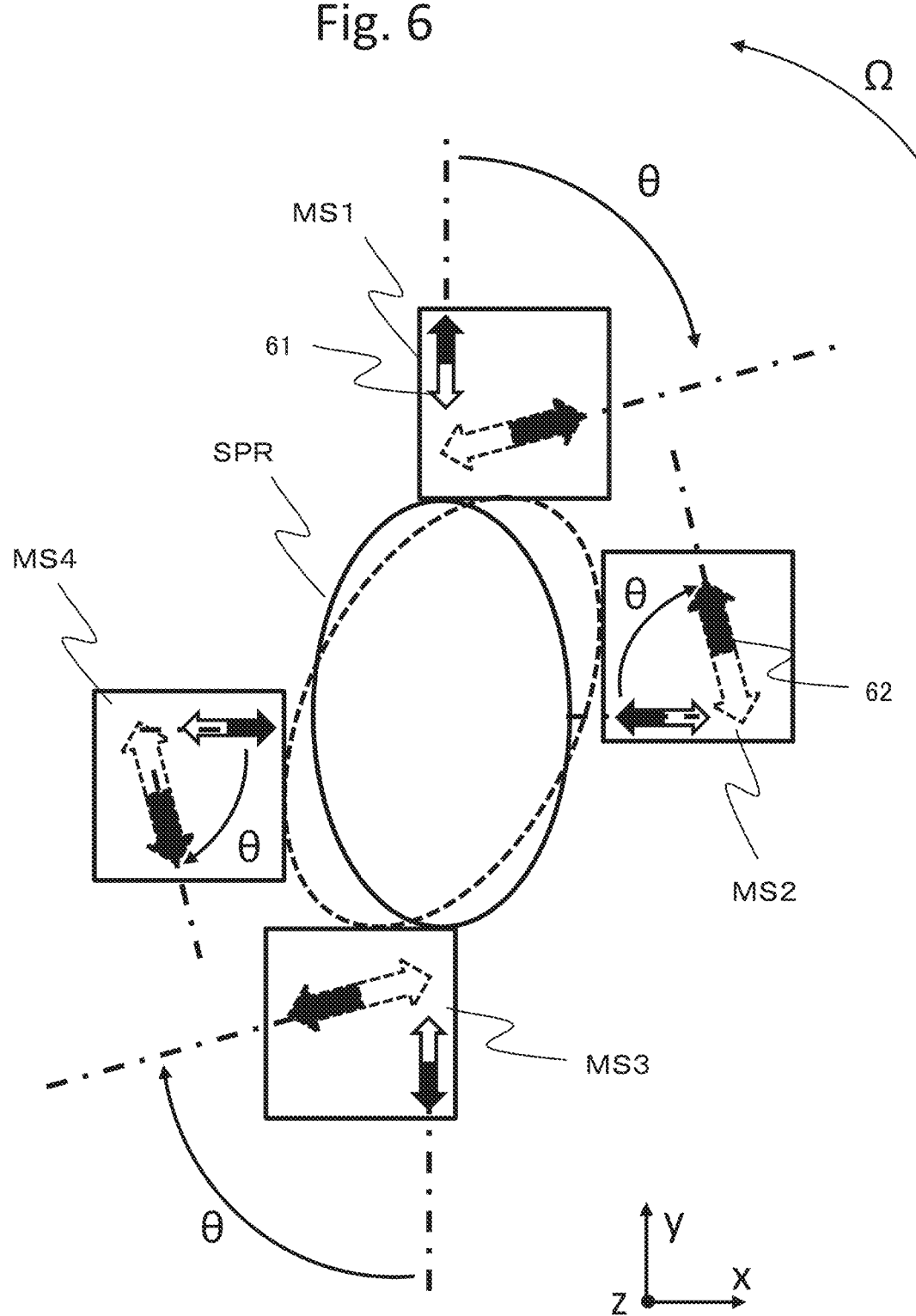
FIG. 6 is a conceptual diagram illustrating a method of detecting an angle in an embodiment.

The operations of the sensor element in a case where the angular velocity (Ω)) is applied around the z direction (clockwise) in FIG. 6 have been described above. Hereinafter, the specific operations will be described in correspondence with the configuration of this embodiment. If the configuration of FIG. 8 is taken as an example, it is assumed that the inertial bodies MS1 to MS4 are driven to vibrate in the radial direction in FIG. 8. In this state, as illustrated in FIG. 6, when the angular velocity ($\Omega$) is applied around the z direction (counterclockwise), due to the Coriolis force, the radial driving vibration rotates in a clockwise direction ("Principle of a Foucault pendulum"). By measuring the slope of this driving vibration, it is possible to measure the rotation angle θ caused by the angular velocity ($\Omega$).

In this case, even when the driving vibration rotates, it is important in terms of improving the detection accuracy of the rotation angle to maintain the amplitude of the driving vibration constant without hindering this rotation. Regarding this point, in this embodiment, as described above, the driving vibration unit 10r allows the inertial bodies MS1 to MS4 to be driven to vibrate in the radial direction, and the driving vibration unit 10c allows the inertial bodies MS1 to MS4 to be driven to vibrate in the circumferential direction. From this fact, according to this embodiment, by combining and controlling the driving vibration unit 10r and the driving vibration unit 10c, even if the direction of the driving vibration of the inertial bodies MS is changed by "the principle of Foucault pendulum", it is possible to calculate the rotation angle while controlling the amplitude of the driving vibration to be constant. This control operation will be described below.

Figure 11:
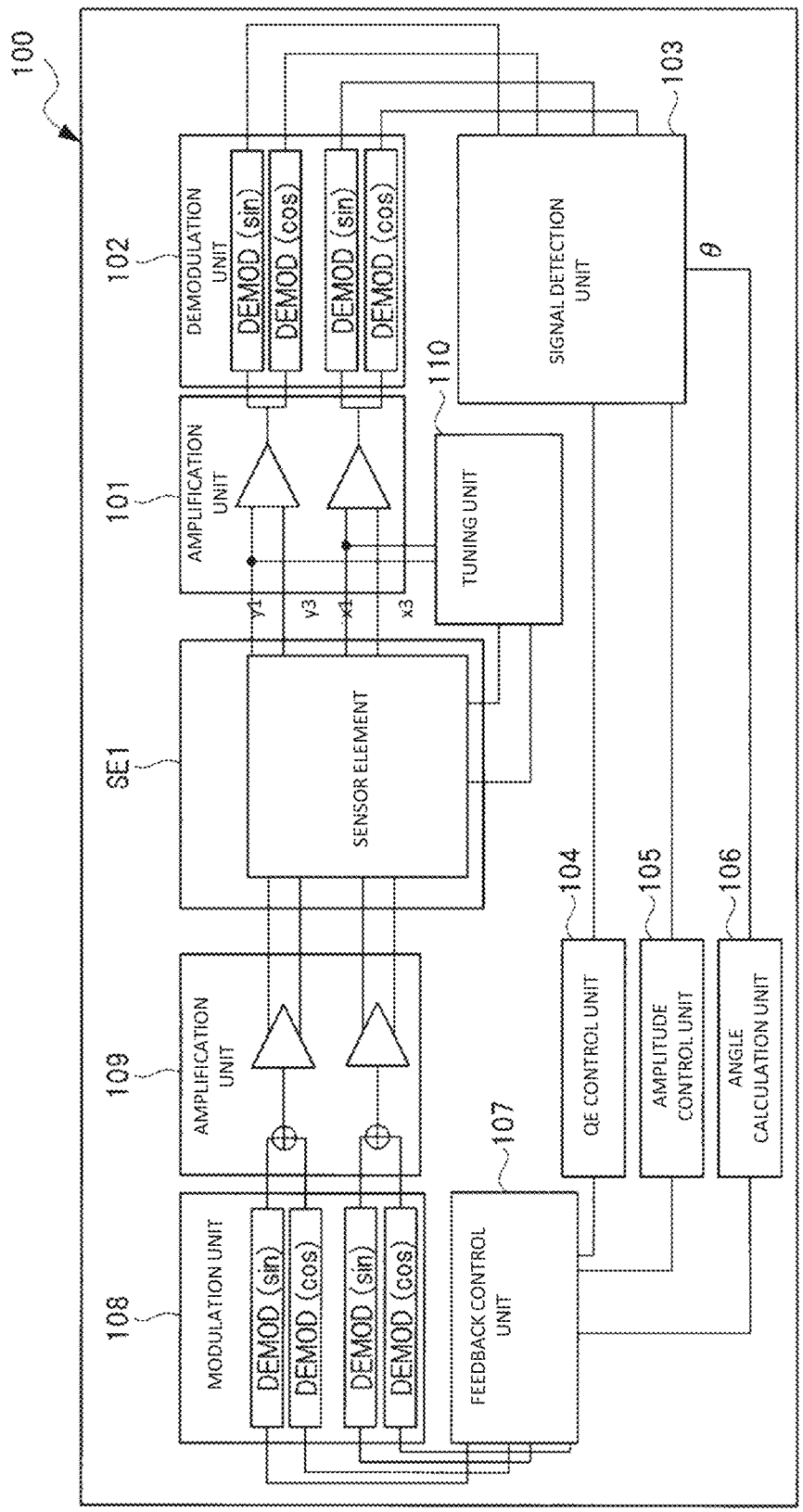
FIG. 11 is a block diagram illustrating a configuration of a sensor system according to this embodiment.

FIG. 11 is a diagram illustrating a configuration of a sensor system 100 according to this embodiment. In this system, since it is sufficient to detect a change in vibration direction due to rotation in the sensor element, various known methods can be applied. However, hereinafter, a circuit method using capacitive elements will be described. As illustrated in FIG. 11, the sensor system 100 according to this embodiment includes a sensor element SE1 which is a gyroscope, an amplification unit 101, a demodulation unit 102, a signal detection unit 103, a quadrature error (QE) control unit 104, an amplitude control unit 105, an angle calculation unit 106, a feedback control unit 107, a modulation unit 108, an amplification unit 109, and a tuning unit 110.

First, in the sensor element SE1 as illustrated in FIG. 8, as described above, the displacement of each inertial body MS in the x direction and the y direction can be detected by the sensor unit 11 (for example, capacitive elements 81 and 82). The displacement x1 of the inertial body MS1 in the x direction is detected as a change in the electrostatic capacitance value by the sensor unit 11, and the displacement x3 of the inertial body MS3 in the x direction is detected as a change in electrostatic capacitance value by the sensor unit 11. On the other hand, the displacement y1 of the inertial body MS1 in the y direction is detected as a change in electrostatic capacitance value by the sensor unit 11, and the displacement y3 of the inertial body MS3 in the y direction is detected as a change in electrostatic capacitance value by the sensor unit 11. Then, the change in the electrostatic capacitance value indicating the displacement in the x direction is converted into the first voltage signal (X) by, for example, a C/V conversion unit (not illustrated). Similarly, the change in the electrostatic capacitance value indicating the displacement in the y direction is converted into the first voltage signal (Y) by, for example, a C/V conversion unit (not illustrated).

Thus, by detecting the displacement of the inertial body MS, it is possible to detect the vibration of the ring-shaped coupling spring SPR connected to the inertial body MS. This corresponds to detecting the vibration indicated by arrows 62 indicated by dotted lines in FIG. 6. In the above description, signals were detected by the sensor units of the inertial bodies MS1 and MS3. However, as apparent from FIG. 6, the signals can be similarly detected from the inertial bodies MS2 and MS4. Therefore, by using the detection signals of the MS2 and the MS4, it is possible to further correct the error. Alternatively, as long as the symmetry of the sensor element is maintained and a sensor capable of detecting the displacement in the x and y directions is built in a single inertial body, vibration of a ring-shaped coupling spring SPR can also be calculated based on a signal from the single inertial body.

Next, as illustrated in FIG. 11, the first voltage signal (X) and the first voltage signal (Y) are amplified by the amplification unit 101 and, after that, are demodulated by the demodulation unit 102 to be separated into components perpendicular to each other. In addition, in the tuning unit 110, matching may be performed between the resonance frequency in the x direction and the resonance frequency in the y direction by using a capacitive element (not illustrated).

Subsequently, the signal detection unit 103 acquires "Quadrature" (a component of the phase perpendicular to the driving vibration), "amplitude" (amplitude of the driving vibration), and "angle" which are useful parameters from the signal demodulated by the demodulation unit 102.

Then, in the QE control unit 104, compensation of "Quadrature" is performed. In addition, the amplitude control unit 105 compares the amplitude acquired by the signal detection unit 103 with a reference value and controls the modulation unit 108 through the feedback control unit 107 so as to obtain a uniform amplitude. Furthermore, the angle calculation unit 106 calculates the rotation angle θ illustrated in FIG. 6. In the example of this embodiment, since there is a relationship of a predetermined ratio (angular gain) between the acquired "angle" and the actual rotation angle θ, the actual rotation angle is calculated by the angle calculation unit 106.

After that, the feedback control unit 107 generates a feedback signal based on the signals supplied from the QE control unit 104, the amplitude control unit 105, and the angle calculation unit 106. In this embodiment, the correction energy for the x-axis and y-axis is calculated by using angles. Next, the feedback signal generated by the feedback control unit 107 is modulated by the modulation unit 108, amplified by the amplification unit 109, and supplied to the driving vibration unit 10 without hindering the rotation angle θ. As a result, according to the sensor system 100 according to this embodiment, by combining and controlling the driving vibration unit 10c and the driving vibration unit 10r, even if the direction of the driving vibration of the inertial bodies MS1 to MS4 is changed by the "principle of Foucault pendulum", it is possible to realize the operations of calculating the rotation angle while controlling the amplitude of the driving vibration to be constant.

Second Embodiment

Figure 12:
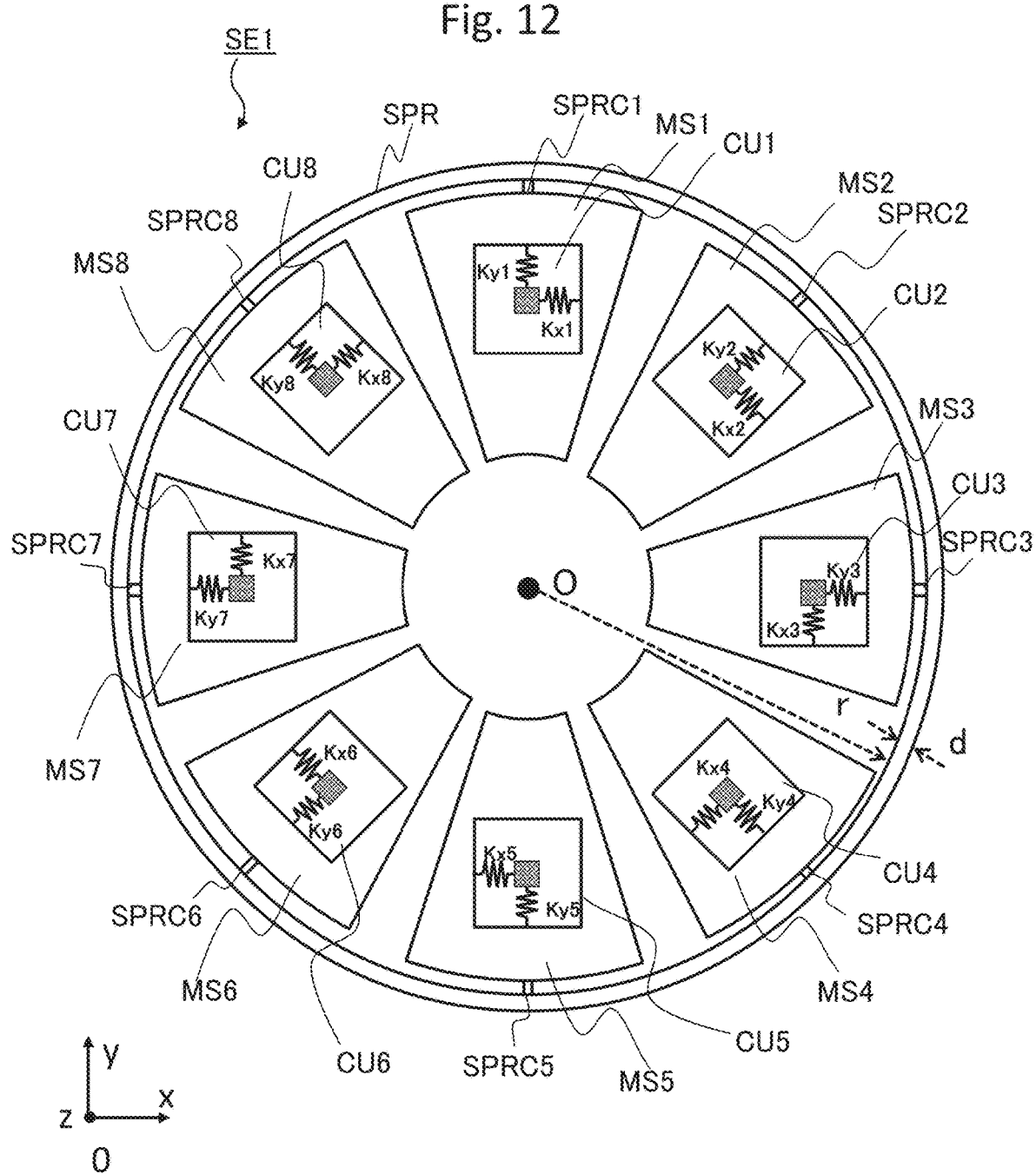
FIG. 12 is a schematic diagram illustrating a planar configuration of a sensor element constituting a gyroscope according to another embodiment of the present invention.

FIG. 12 is a diagram illustrating a planar configuration of a sensor element SE1 constituting a gyroscope according to another embodiment of the present invention. In the first embodiment, the inertial bodies MS are arranged outside the ring-shaped coupling spring SPR, whereas in the second embodiment, the inertial bodies MS are arranged inside the ring-shaped coupling spring SPR. In addition, the number of inertial bodies MS is set to five or more.

<Arrangement of Inertial Bodies>

Description will be made with reference to FIG. 12. This embodiment is configured with inertial bodies MS1 to MS8, anchor connection units (connection units) CU1 to CU8, a ring-shaped coupling spring SPR, and ring connection units SPRC1 to SPRC8.

The connection units CU1 to CU8 may have the same structure as that of the first embodiment. That is, the connection unit CU supporting the inertial body MS vibrates the inertial body MS in the circumferential direction and the radial direction of the ring-shaped coupling spring SRP. Furthermore, the resonance frequency fx in the circumferential direction and the resonance frequency fy in the radial direction are configured to be equal to each other (fx=fy).

As illustrated in FIG. 12, the ring-shaped coupling spring SPR has an inner diameter r and a thickness d. The resonance frequency frs of the ring-shaped coupling spring SPR and the resonance frequency frd in the degenerate mode can be determined by the following equation according to the inner diameter r, the thickness d, and the degenerate mode θ.

$$frs = frd = \omega_n/2\pi \quad (1)$$

Herein, $$\omega_n = \frac{1}{\sqrt{12}} \cdot \frac{b}{R^2} \cdot \frac{n(n^2-1)}{\sqrt{n^2+1}} \cdot \sqrt{\frac{E}{\rho}} \quad \text{[Mathematical Formula 2]}$$

n: state in degenerate mode

That is, the second embodiment is configured with the inertial bodies MS1 to MS8, the anchor connection units CU1 to CU8, the ring-shaped coupling spring SPR, and the ring connection units SPRC1 to SPRC8, and the resonance frequencies are set as fx=fy and frs=frd. In addition, the resonance mode fs and degenerate mode fd of the entire structure are between fx (fy) and frs (frd).

Since the inertial bodies MS1 to MS8 are configured to have the same structure, the inertial bodies MS1 to MS8 will be described as inertial bodies MS. In addition, since the connection units CU1 to CU8 are configured to have the same structure, the connection units CU1 to CU8 will be described as the connection units CU.

The elastic coefficient of the plurality of beams constituting the connection unit CU is denoted by Kx, and the elastic coefficient in the direction perpendicular to the elastic coefficient Kx is denoted by Ky. In addition, the elastic coefficient Kx is an elastic coefficient when the inertial body MS is displaced in the circumferential direction, and the elastic coefficient Ky is an elastic coefficient when the inertial body MS is displaced in the radial direction.

As illustrated in FIG. 12, in the second embodiment, eight inertial bodies MS1 to MS8 are connected to the coupling spring SPR at an interval of 45°. That is, the inertial bodies MS are arranged at opposite positions with respect to the center O. In the vibration mode (primary mode) as illustrated in FIG. 1A, the inertial bodies MS1, MS3, MS5, and MS7 are at antinode positions of the vibration and excited in the radial direction. The inertial bodies MS1 and MS5 are in an opposite phase relationship in the y direction, and the inertial bodies MS3 and MS7 are in an opposite phase relationship in the x direction. In addition, the inertial bodies MS1 and MS5 have the maximum amplitude, and the inertial bodies MS3 and MS7 also have the maximum amplitude.

On the other hand, the inertial bodies MS2, MS4, MS6, and MS8 are at the node positions of the vibration. Since the vibration amplitude in the radial direction is small and the vibration amplitude also exists in the circumferential direction, these inertial bodies are excited in the circumferential direction. Furthermore, the inertial bodies MS2 and MS6 are in opposite phases in the direction of 45° to the x+ axis, and the inertial bodies MS4 and MS8 are in opposite phases in the direction of 135° to the x+ axis. In addition, the inertial bodies MS1 and MS5 have the maximum amplitude, and the inertial bodies MS3 and MS7 also have the maximum amplitude. The amplitude of the inertial body arranged at the node is smaller than the amplitude of the inertial body arranged at the antinode.

<Arrangement Example of Capacitive Element>

Figure 13A:
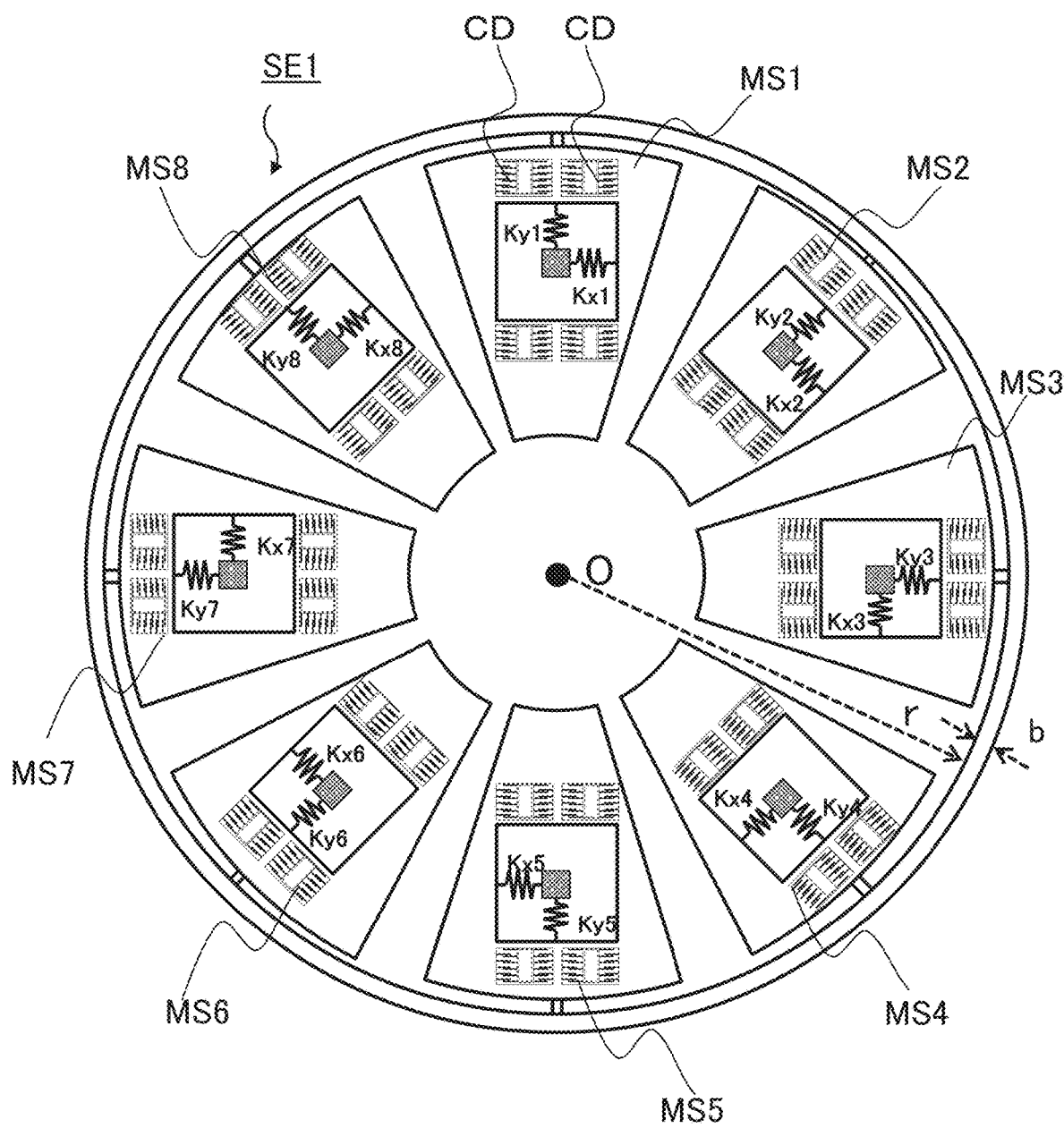
FIG. 13A is a plan diagram illustrating an example of a planar configuration of a sensor element.

FIG. 13A is a plan diagram illustrating an arrangement example of the capacitive element CD in the embodiment of FIG. 12. The comb-tooth-shaped electrode is an example of the capacitive element CD. Details of the capacitive element are the same as those in the first embodiment. In addition, since the group of the inertial bodies MS1, MS3, MS5, and MS7 arranged at the perpendicular position or the group of the inertial bodies MS2, MS4, MS6, and MS8 are symmetrical, the driving vibration unit and the sensor unit may be provided in the group. Therefore, all of the driving vibration unit and the sensor unit in one inertial body MS may not be provided in one inertial body MS, and thus, it is possible to reduce the number of electrodes.

For example, in FIG. 13A, four capacitive elements (comb-tooth-shaped electrodes) CD are provided to one inertial body MS. For example, among the group of the inertial bodies MS1, MS3, MS5, and MS7, an arbitrary capacitive element CD may be used as a driving vibration unit, and an arbitrary capacitive element CD may be used as a sensor unit.

Figure 13B:
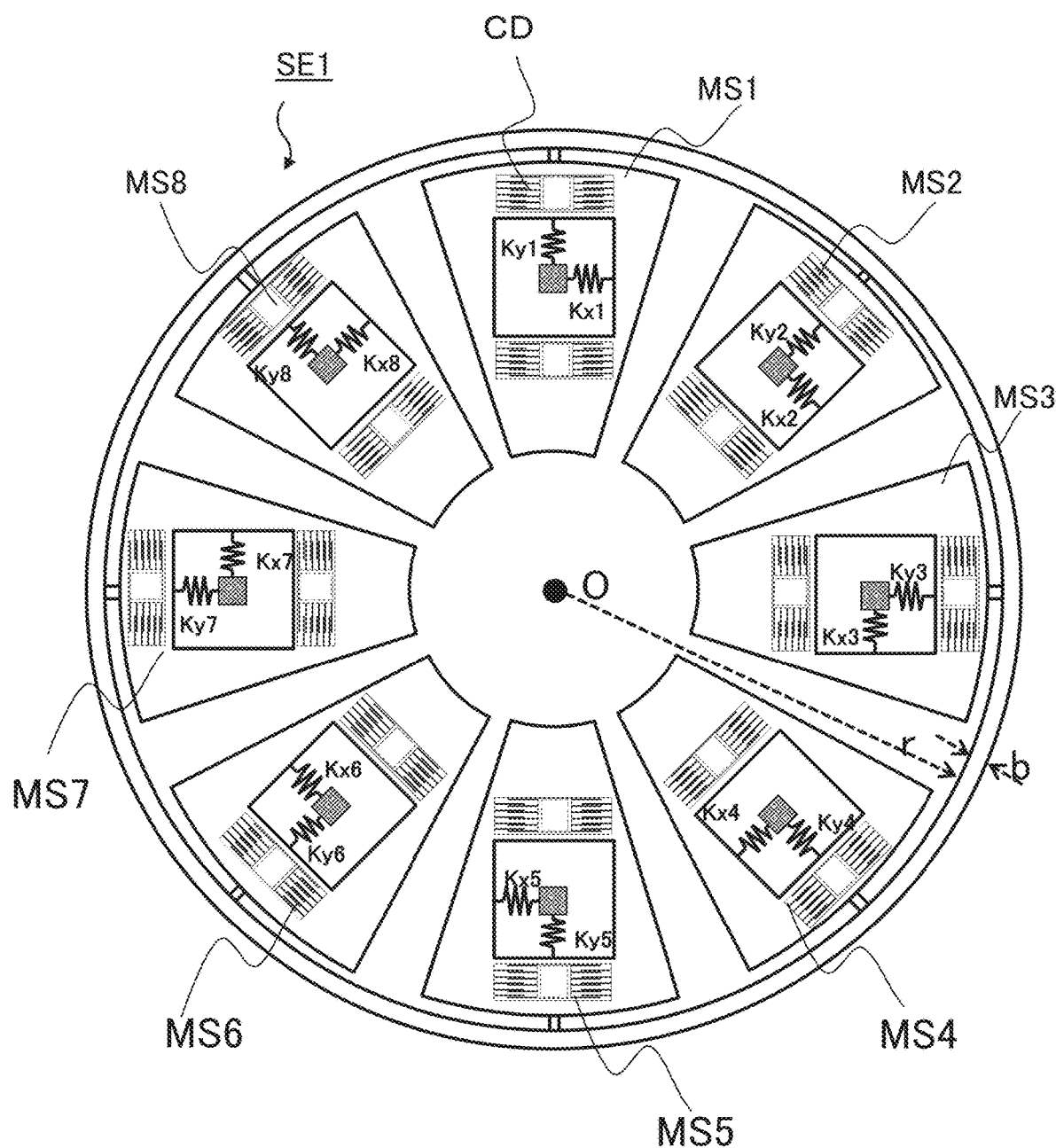
FIG. 13B is a plan diagram illustrating another planar configuration example of the sensor element.

FIG. 13B is a plan diagram illustrating another arrangement example of the capacitive element CD in the embodiment of FIG. 12. For example, in FIG. 13B, two capacitive elements (comb-tooth-shaped electrodes) CD are provided to one inertial body MS. For example, among the group of the inertial bodies MS1, MS3, MS5, and MS7, an arbitrary capacitive element CD may be used as a driving vibration unit, and an arbitrary capacitive element CD may be used as a sensor unit.

<Explanation of Operations of Sensor Element>

Figure 14A:
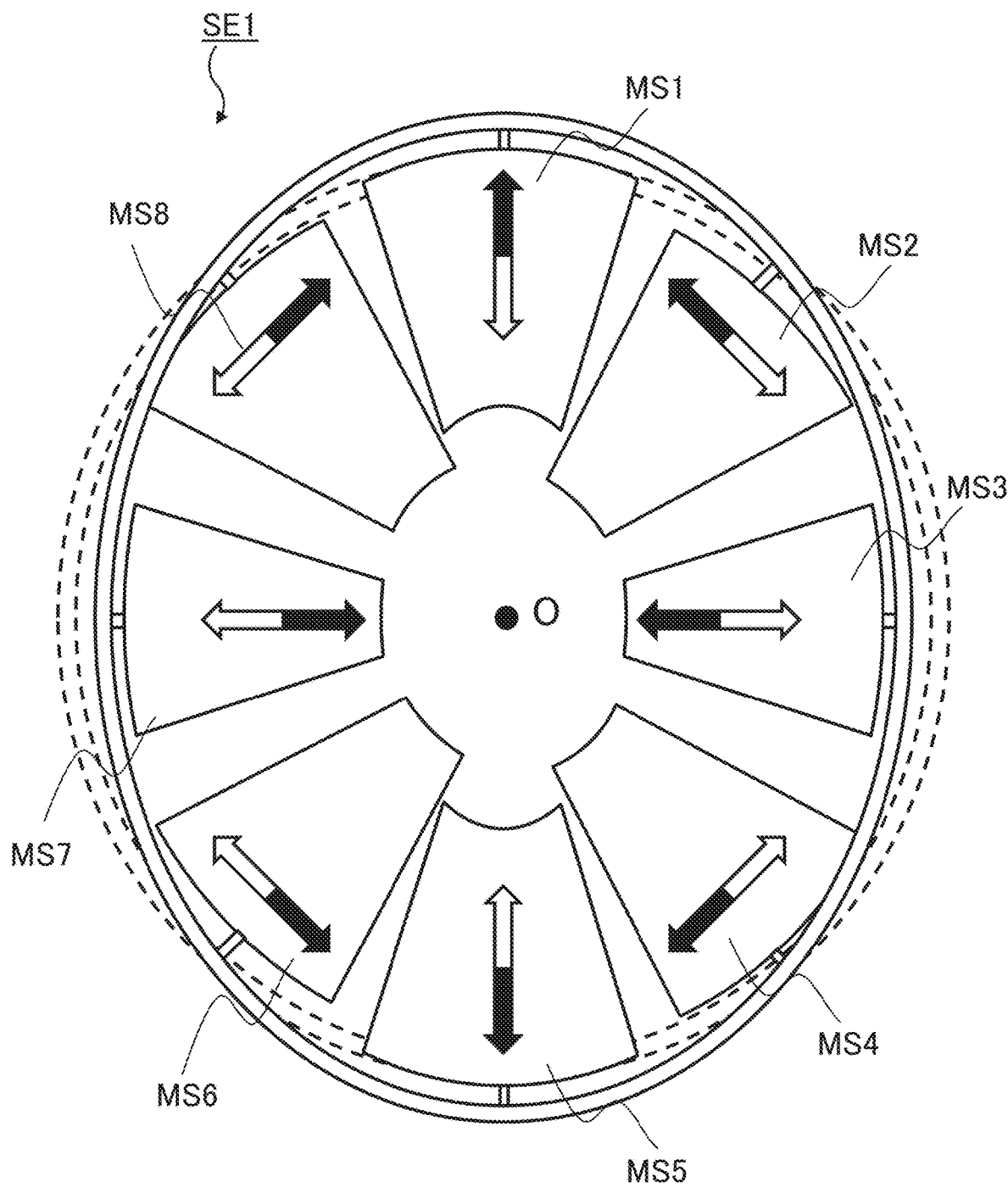
FIG. 14A is a schematic diagram illustrating operations of a sensor element.
Figure 14B:
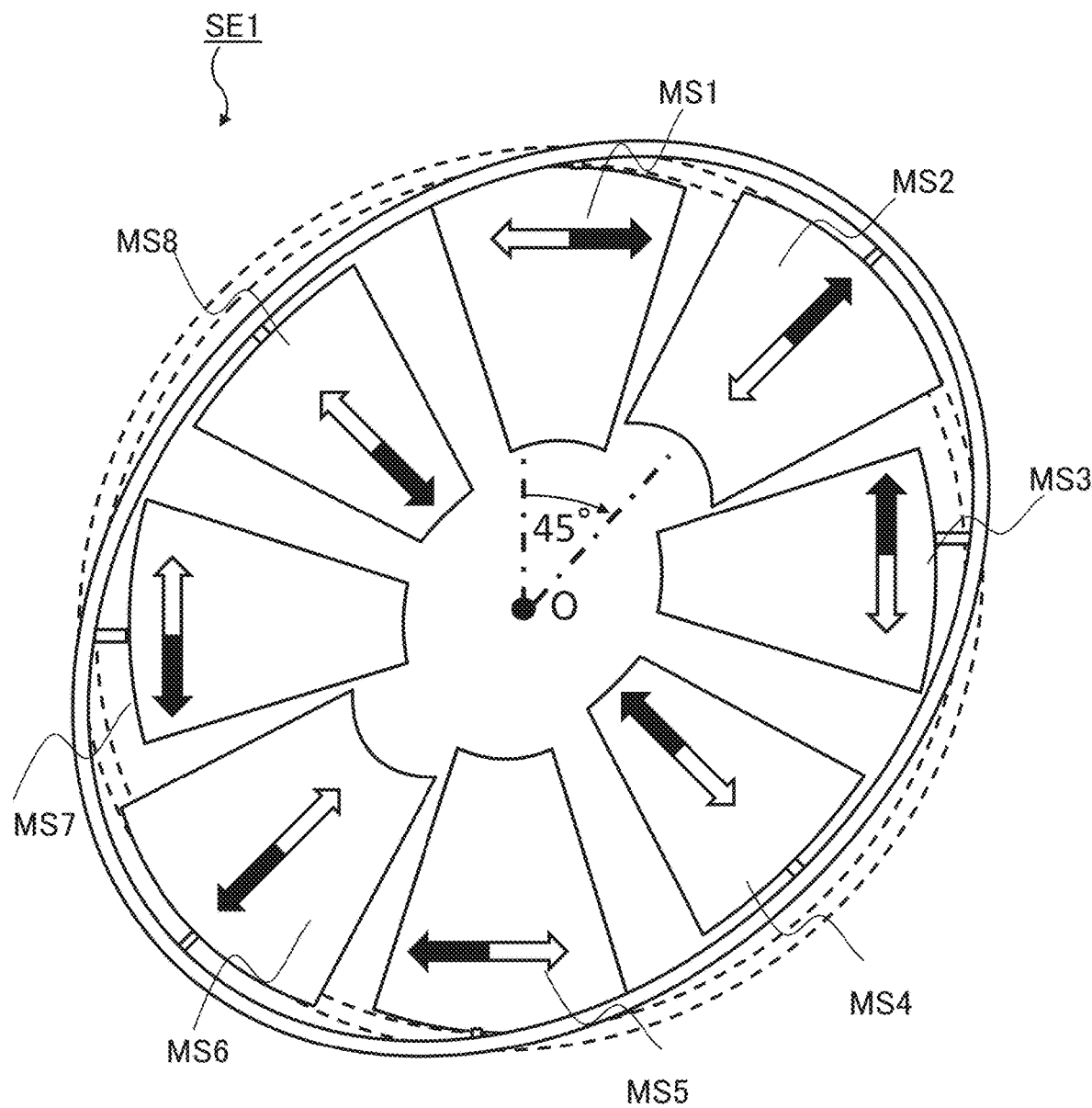
FIG. 14B is a schematic diagram (degenerate mode) illustrating operations of a sensor element.

FIG. 14 schematically illustrates the operations of the sensor element SE1 of FIG. 12. FIG. 14A illustrates a primary mode of the resonance mode. FIG. 14B illustrates a shape in the degenerate mode with θ=45° (n=2). FIG. 14C illustrates the principle of exchanging energy in a case where an angular velocity is applied around the z direction (clockwise).

That is, when the angular velocity is applied by driving as illustrated in FIG. 14A, as illustrated in FIG. 14C, the inertial bodies MS1, MS3, MS5, and MS7 that are driven in the radial direction exchange energy in the circumferential direction, and the inertial bodies MS2, MS4, MS6, and MS8 that are driven in the circumferentially driven exchange energy in the radial direction. In FIG. 14C, θ is an angle.

Similarly, when driven in the degenerate mode (degenerate mode=45°) illustrated in FIG. 14B, the inertial bodies MS1, MS3, MS5, and MS7 are at node positions of vibration and are excited in the circumferential direction, whereas the inertial bodies MS2, MS4, MS6, and MS8 are at antinode positions of vibration and are excited in the radial direction.

In this manner, due to the unique characteristic of the coupling spring, by utilizing the natural vibration mode of θ=45° and the degenerate mode thereof, each of the inertial bodies MS1 to MS8 can be driven with the same resonance frequency in two modes of the perpendicular direction of the circumferential and radial directions.

<Layout Example of Inertial body MS and Capacitive Element CD>

Figure 15A:
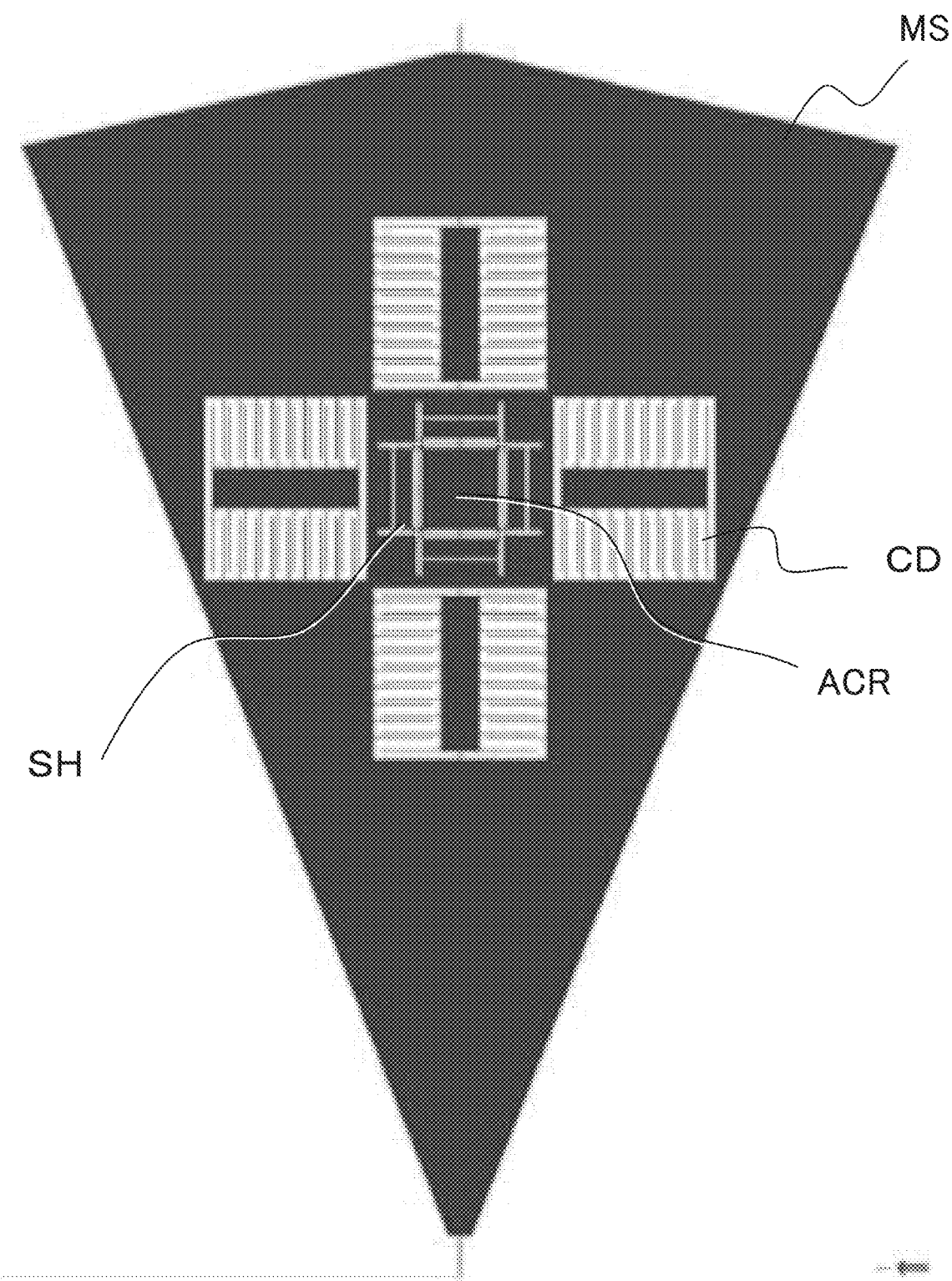
FIG. 15A is a plan diagram illustrating a configuration of an inertial body.

FIG. 15A is a plan diagram illustrating a layout example of the inertial body MS in the sensor element SE1 of FIG. 12. In the figure, members are present in the black portion, and the white portion is air gap. An anchor ACR exists at the center, and four shuttles SH and four capacitive elements CD are arranged around the anchor ACR. Such a pattern can be formed by processing the device layer 1c by an etching technique or the like as illustrated in the cross-sectional diagram of FIG. 9.

Figure 15B:
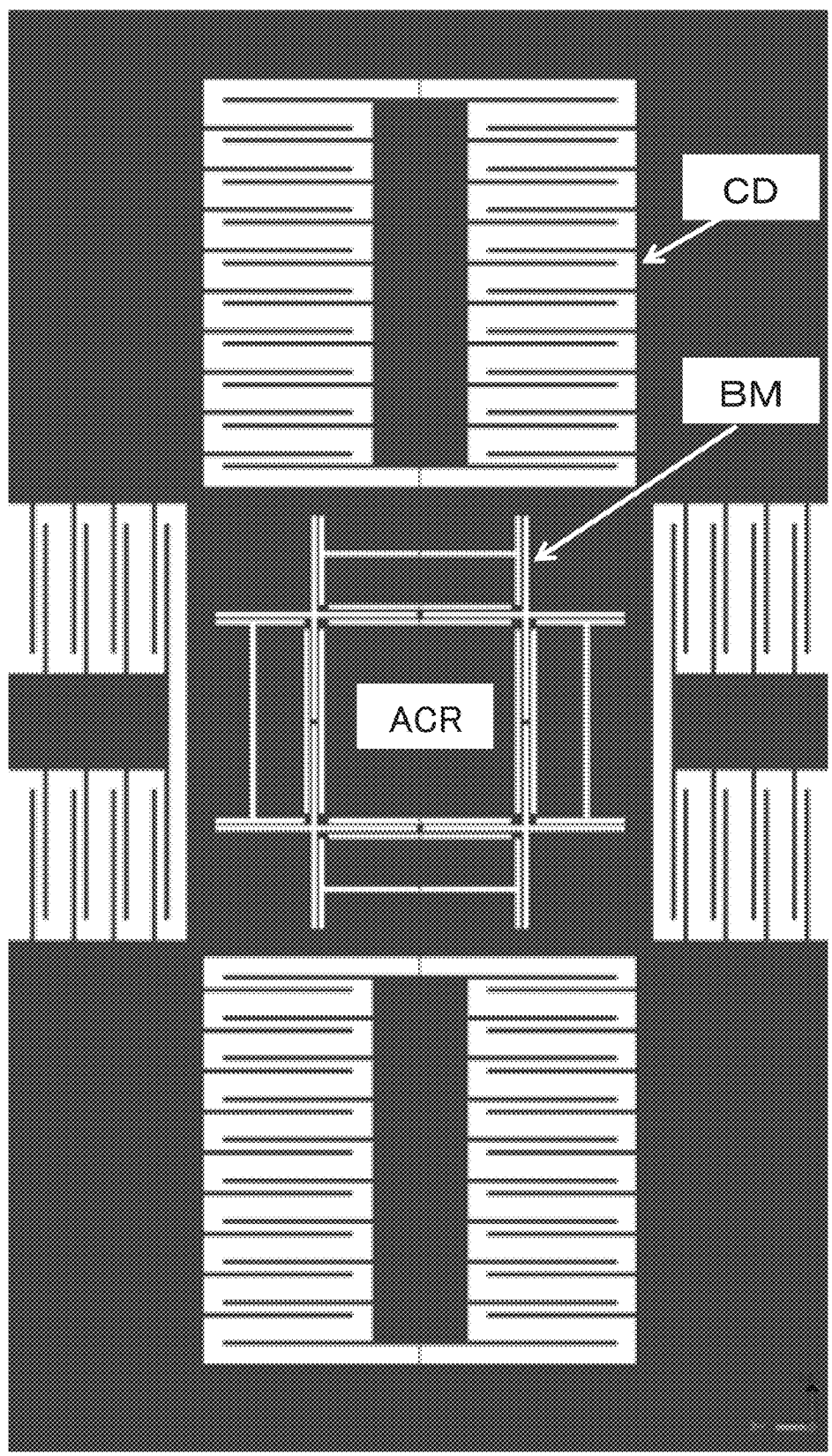
FIG. 15B is an enlarged plan diagram illustrating a configuration of an inertial body.

FIG. 15B is a partial enlarged diagram of a vicinity of the anchor ACR of FIG. 15A. The thin white portions seen around the anchor ACR at the center are the beams BM. The structure of FIG. 15 can be produced by applying, for example, semiconductor manufacturing technology for manufacturing MEMS. In addition, each of the capacitive elements CD is configured so as to be able to detect a force in a specific direction or is configured to be able to exert a force in a specific direction.

<Effects of Embodiment>

In the first to third embodiments of the present invention described above, since the inertial bodies MS are connected to the ring-shaped coupling spring SPR, frequency matching of each inertial body MS is easy to obtain. In addition, by effectively utilizing the mass of the inertial bodies MS, there is an advantage of capable of expecting low noise.

For example, when the radial elastic coefficient Ky1 of the inertial body MS1 of the embodiment of FIG. 12 has a variation of 10% due to a processing error, it is possible to suppress the deviation of the resonance frequency of the inertial body MS1 in the radial direction and the circumferential direction up to 0.01%. That is, the deviation between the driving vibration resonance frequency and the sensing axis frequency due to a process variation can be suppressed and can be allowed to fall into a calibration range.

In addition, even when the mass of the inertial body MS1 varies from other inertial bodies by etching of Si during processing, it is possible to suppress deviation of the resonance frequencies of the inertial body MS1 and other inertial bodies in the radial direction and the circumferential direction.

By arranging the ring-shaped coupling spring SPR outside the inertial body MS, robustness in the thickness variation of the ring is also obtained. That is, in a case where the radial elastic coefficient Ky and the circumferential elastic coefficient Kx of the inertial bodies MS1 to MS8 are different, or even in a case where the masses of the inertial bodies due to the process variation are different, the resonance frequencies of the driving vibration axis and the sensing axis can be matched by the mechanical unique characteristics of the eigen mode and the degenerate mode of the ring-shaped coupling spring SPR. That is, since the inertial bodies MS1 to MS8 have the same resonance frequency in the circumferential direction and the resonance frequency in the radial direction, the energy conversion can be realized, and the angle can be directly output.

Third Embodiment

Figure 16:
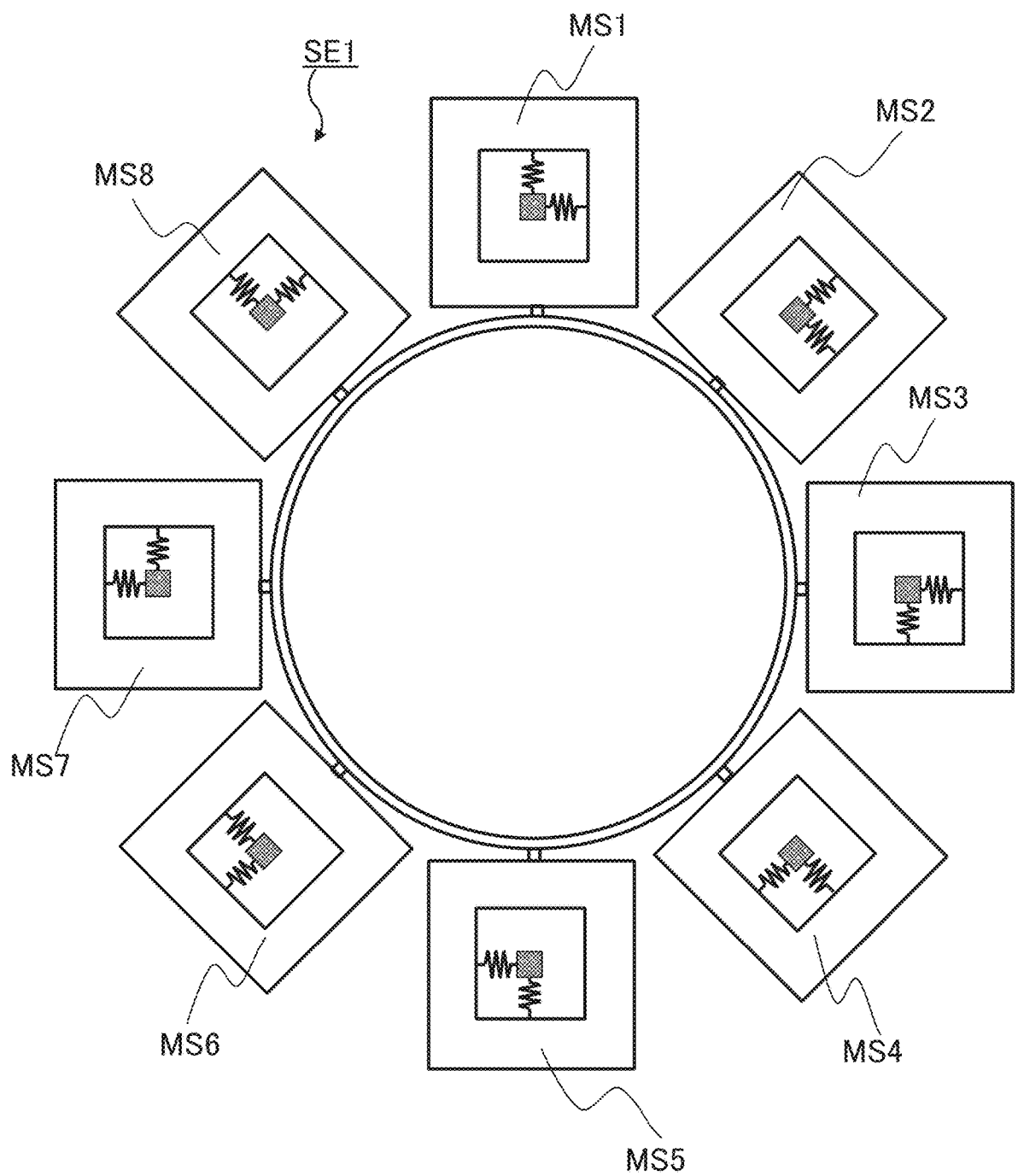
FIG. 16 is a plan diagram illustrating another planar configuration example of the sensor element.

FIG. 16 is a diagram illustrating a planar configuration of a sensor element SE1 constituting a gyroscope, which is another embodiment of the present invention. Although each component is the same as that of the second embodiment, the inertial bodies MS1 to MS8 are arranged outside the ring-shaped coupling spring SPR. Therefore, the arrangement of the inertial body is not restricted by the ring-shaped coupling spring SPR. For this reason, the shape and arrangement of the inertial bodies can be easily designed into a symmetrical structure, and a robustness of the design is improved.

The present invention is not limited to the above-described embodiments, but includes various modified examples. For example, it is possible to replace a portion of the configuration of one embodiment with the configuration of another embodiment, and the configuration of another embodiment can be added to the configuration of one embodiment. In addition, it is possible to add, delete, or replace the configuration of another embodiment with respect to a portion of the configuration of each embodiment.

INDUSTRIAL APPLICABILITY

The present invention can be used as a gyroscope for measuring a rotation angle and an angular velocity.

REFERENCE SIGNS LIST sensor element: SE
ring-shaped coupling spring: SPR
anchor: ACR
shuttle: SH
connection unit: CU
beam: BM

The invention claimed is:

1. A gyroscope comprising:
   a ring-shaped elastic body;
   a plurality of inertial bodies that are mechanically connected to the ring-shaped elastic body and capable of vibrating in an arbitrary direction in a plane;
   a driving vibration unit that allows the inertial bodies to vibrate;
   a sensor unit that detects displacement of the inertial bodies;
   wherein the plurality of inertial bodies are supported by:
   a first beam that is deformable in a first direction in the plane and less deformable in a second direction different from the first direction than in the first direction; and
   a second beam that is deformable in the second direction in the plane and less deformable in the first direction than in the second direction.

2. The gyroscope according to claim 1, wherein the plurality of inertial bodies are arranged in a point symmetry with respect to a center of the ring-shaped elastic body and further arranged evenly in a circumferential direction of the ring-shaped elastic body.

3. The gyroscope according to claim 1,
   wherein the first direction and the second direction are perpendicular directions, and
   wherein each of the plurality of inertial bodies is supported by the first beam and the second beam so that a spring constant kx at a time of resonance in the first direction and a spring constant ky at a time of resonance in the second direction are equal to each other.

4. The gyroscope according to claim 1,
   wherein the plurality of inertial bodies are mechanically connected to the ring-shaped elastic body by connection units, and wherein the connection unit is configured so that a cross-sectional area of the connection units is smaller than a cross-sectional area of the ring-shaped elastic body.

5. The gyroscope according to claim 1,
wherein the plurality of inertial bodies are mechanically connected to the ring-shaped elastic body by connection units, and
wherein the connection units suppress rotation of the inertial bodies by deformation in the plane.

6. A gyroscope comprising:
a first inertial body that is displaceable in a first direction and a second direction perpendicular to the first direction;
a second inertial body that is displaceable in the first direction and the second direction;
a third inertial body that is displaceable in the first direction and the second direction;
a fourth inertial body that is displaceable in the first direction and the second direction;
a first connection unit that supports the first inertial body;
a second connection unit that supports the second inertial body;
a third connection unit that supports the third inertial body;
a fourth connection unit that supports the fourth inertial body; and
a connection body that is provided among the first inertial body, the second inertial body, the third inertial body, and the fourth inertial body and connects the first inertial body, the second inertial body, the third inertial body, and the fourth inertial body;
wherein the first, second, third, and fourth inertial bodies are supported, respectively by:
a first beam that is deformable in a first direction in the plane and less deformable in a second direction different from the first direction than in the first direction;
a second beam that is deformable in the second direction in the plane and less deformable in the first direction than in the second direction;
a third beam that is deformable in the second direction in the plane and less deformable in the first direction than in the second direction; and
a fourth beam that is deformable in the second direction in the plane and less deformable in the first direction than in the second direction.

7. A gyroscope comprising:
a plurality of inertial bodies that are displaceable in a first direction and a second direction perpendicular to the first direction;
connection units that support the plurality of inertial bodies; and
a coupling spring that is provided among the plurality of inertial bodies and connects the plurality of inertial bodies;
wherein the coupling spring is configured with a ring-shaped elastic body; and
wherein the plurality of inertial bodies are supported by:
a first beam that is deformable in a first direction in the plane and less deformable in a second direction different from the first direction than in the first direction; and
a second beam that is deformable in the second direction in the plane and less deformable in the first direction than in the second direction.

8. The gyroscope according to claim 7, wherein the plurality of inertial bodies are arranged in a point symmetry with respect to a center of the ring-shaped elastic body and further arranged evenly in a circumferential direction of the ring-shaped elastic body.

9. The gyroscope according to claim 7,
wherein the connection units include:
an anchor that is fixed to a substrate;
a first shuttle that is connected to the anchor and configured to be displaceable in the first direction relative to the anchor and less displaceable in the second direction than in the first direction; and
a second shuttle that is connected to the anchor and configured to be displaceable in the second direction relative to the anchor and less displaceable in the first direction than in the second direction,
wherein the first shuttle is connected to the inertial bodies and is configured to be displaceable in the second direction relative to the inertial bodies and less displaceable in the first direction than in the second direction, and
wherein the second shuttle is connected to the inertial bodies and is configured to be displaceable in the first direction relative to the inertial bodies and less displaceable in the second direction than in the first direction.

10. The gyroscope according to claim 7, wherein the plurality of inertial bodies are arranged inside the ring-shaped elastic body.

11. The gyroscope according to claim 7, wherein the plurality of inertial bodies have an equivalent mass.

12. The gyroscope according to claim 7,
wherein each of the inertial bodies includes a driving vibration unit that allows the inertial bodies to vibrate, and
wherein the driving vibration unit excites the ring-shaped elastic body in a cos 2θ resonance mode.

13. The gyroscope according to claim 12, wherein each of the inertial bodies includes a sensor unit that detects vibration of the inertial body and detects an angle of an applied rotation by measuring an angle between a driving vibration axis by the driving vibration unit and a new vibration axis by the applied rotation based on an output signal of the sensor unit.

* * * * *